(12) United States Patent
Omata et al.

(10) Patent No.: US 9,106,170 B2
(45) Date of Patent: Aug. 11, 2015

(54) CONTROL DEVICE OF AC MOTOR

(71) Applicant: DENSO CORPORATION, Kariya, Aichi-pref. (JP)

(72) Inventors: Ryuji Omata, Obu (JP); Takeshi Itoh, Nagoya (JP); Hirofumi Kako, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 64 days.

(21) Appl. No.: 14/174,200

(22) Filed: Feb. 6, 2014

(65) Prior Publication Data
US 2014/0225541 A1    Aug. 14, 2014

(30) Foreign Application Priority Data
Feb. 8, 2013   (JP) .................................. 2013-23200

(51) Int. Cl.
| H02P 1/04 | (2006.01) |
| H02P 6/00 | (2006.01) |
| H02H 7/09 | (2006.01) |
| H02P 21/00 | (2006.01) |
| H02P 27/04 | (2006.01) |

(52) U.S. Cl.
CPC ............ *H02P 21/0035* (2013.01); *H02P 27/04* (2013.01)

(58) Field of Classification Search
CPC ............. H02P 27/04; H02P 6/16; H02P 6/08; H02P 6/001; H02P 6/085
USPC ................... 318/400.09, 400.21, 400.01, 700
See application file for complete search history.

(56) References Cited

U.S. PATENT DOCUMENTS

| 2006/0119312 A1* | 6/2006 | Okamura et al. ............. 318/807 |
| 2007/0132423 A1* | 6/2007 | Ajima et al. ................. 318/719 |
| 2008/0079385 A1 | 4/2008 | Hashimoto et al. |
| 2008/0111516 A1* | 5/2008 | Inokuma ...................... 318/799 |
| 2011/0074320 A1* | 3/2011 | Nakamura et al. ....... 318/400.02 |

(Continued)

FOREIGN PATENT DOCUMENTS

| JP | 60-261378 | 12/1985 |
| JP | 2003-189634 | 7/2003 |

(Continued)

OTHER PUBLICATIONS

Omata, et al., U.S. Appl. No. 14/174,102, filed Feb. 6, 2014.

(Continued)

*Primary Examiner* — Eduardo Colon Santana
*Assistant Examiner* — Gabriel Agared
(74) *Attorney, Agent, or Firm* — Nixon & Vanderhye PC

(57) ABSTRACT

A control device for controlling a three phase AC motor with an inverter includes: a current acquisition device for a current of the motor; a rotation angle acquisition device for a rotation angle of the motor; a current estimation device for a current estimated value; a first voltage command value operation device for a first voltage command value; a voltage command reference value operation device for a voltage command reference value; a second voltage command value operation device for a second voltage command value; a control mode switching device for first and second control modes generating a drive signal of the inverter based on the first and second voltage command value, respectively; and a number-of-revolutions operation device. When the revolution number is more than a threshold, the first control mode is selected. When the revolution number is not more than the threshold, the second control mode is selected.

5 Claims, 16 Drawing Sheets

(56) References Cited

U.S. PATENT DOCUMENTS

| | | | |
|---|---|---|---|
| 2011/0080131 A1* | 4/2011 | Shimada et al. | 318/503 |
| 2011/0148336 A1* | 6/2011 | Hayashi | 318/400.04 |
| 2014/0077739 A1* | 3/2014 | Wang et al. | 318/400.37 |
| 2014/0145665 A1* | 5/2014 | Shouji | 318/503 |

FOREIGN PATENT DOCUMENTS

| | | |
|---|---|---|
| JP | 2004-7900 | 1/2004 |
| JP | 2004-159391 | 6/2004 |
| JP | 2007-215306 | 8/2007 |

OTHER PUBLICATIONS

Omata, et al., U.S. Appl. No. 14/174,147, filed Feb. 6, 2014.
Omata, et al., U.S. Appl. No. 14/174,159, filed Feb. 6, 2014.
Omata, et al., U.S. Appl. No. 14/174,161, filed Feb. 6, 2014.
Omata, et al., U.S. Appl. No. 14/174,193, filed Feb. 6, 2014.
Omata, et al., U.S. Appl. No. 14/174,213, filed Feb. 6, 2014.
Omata, et al., U.S. Appl. No. 14/174,515, filed Feb. 6, 2014.
Office Action (2 pages) dated Dec. 9, 2014, issued in corresponding Japanese Application No. 2013-023200 and English translation (3 pages).

* cited by examiner

CONTROL DEVICE OF AC MOTOR

CROSS REFERENCE TO RELATED APPLICATION

This application is based on Japanese Patent Application No. 2013-23200 filed on Feb. 8, 2013, the disclosure of which is incorporated herein by reference.

TECHNICAL FIELD

The present disclosure relates to a control device of an AC motor.

BACKGROUND

In recent years, from the social requirement of lower fuel consumption and less exhaust emission, an electric automobile and a hybrid automobile, each of which is mounted with an AC motor as a power source of a vehicle, is drawing attention. For example, in some of the hybrid automobiles, a DC power source made of a secondary battery or the like and an AC motor are connected to each other via an electric power conversion device constructed of an inverter and the like, and a DC voltage of the DC power source is converted into an AC voltage by the inverter to thereby drive the AC motor.

In the control device of the AC motor mounted in this kind of hybrid automobile and electric automobile, there has been known a technique in which a current sensor for sensing a phase current is provided in one phase to thereby reduce the number of current sensors, whereby a construction near three phase output terminals of an inverter can be reduced in size and a control system of the AC motor can be reduced in cost (for example, see patent document 1).

In the patent document 1, one phase control is performed in the following manner: a current sensor value of one phase is used for the one phase; and for other phases, three phase AC current command values, which can be acquired by inversely dq transforming a d axis current command value and a q axis current command value on the basis of an electric angle, are used as current estimated values of the other phases. Three phase AC current command values acquired by inversely dq transforming the d axis current command value and the q axis current command value does not become information correctly reflecting the actual current of the AC motor, and hence the control of the AC motor is likely to become unstable. In particular, when the number of revolutions of the AC motor is small, a current change in a current sensed value and a rotation angle movement per a sampling interval become small and hence actual information is scarcer, which hence is likely to make the control of the AC motor more unstable.

[Patent Document 1] JP-A No. 2008-86139 (corresponding to US 2008/0079385-A1)

SUMMARY

It is an object of the present disclosure to provide a control device of an AC motor that can drive the AC motor stably even in a low rotation range in which the number of revolutions of the AC motor is small.

According to an aspect of the present disclosure, a control device of a three phase alternating current motor having an applied voltage, which is controlled by an inverter, the control device controls a drive of the motor, and includes: a current acquisition device for acquiring a current sensed value from a current sensor, which is disposed on a sensor phase of the motor that is one of three phases of the motor; a rotation angle acquisition device for acquiring a rotation angle sensed value from a rotation angle sensor, which senses a rotation angle of the motor; a current estimation device for operating a current estimated value according to the current sensed value and the rotation angle sensed value; a first voltage command value operation device for operating a first voltage command value according to a current command value, which relates to the drive of the motor, and the current estimated value to be fed back; a voltage command reference value operation device for operating a voltage command reference value using a theoretical formula of an electric motor according to the current command value; a second voltage command value operation device for correcting the voltage command reference value in order to operate a second voltage command value; a control mode switching device for switching between a first control mode, for generating a drive signal relating to a drive of the inverter based on the first voltage command value, and a second control mode, for generating the drive signal based on the second voltage command value; and a number-of-revolutions operation device for operating the number of revolutions of the motor according to the rotation angle sensed value. When the number of revolutions is more than a predetermined determination threshold value, the control mode switching device selects the first control mode. When the number of revolutions is not more than the predetermined determination threshold value, the control mode switching device selects the second control mode.

In the above control device, the voltage command reference value is corrected and the second voltage command value is operated, and in the low rotation range, the drive of the AC motor is controlled in the second control mode based on the second voltage command value. In this way, according to the above control device, in the low rotation range, the drive of the AC motor can be stably controlled from the time when the AC motor is started and driven to the time when the AC motor is stopped.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
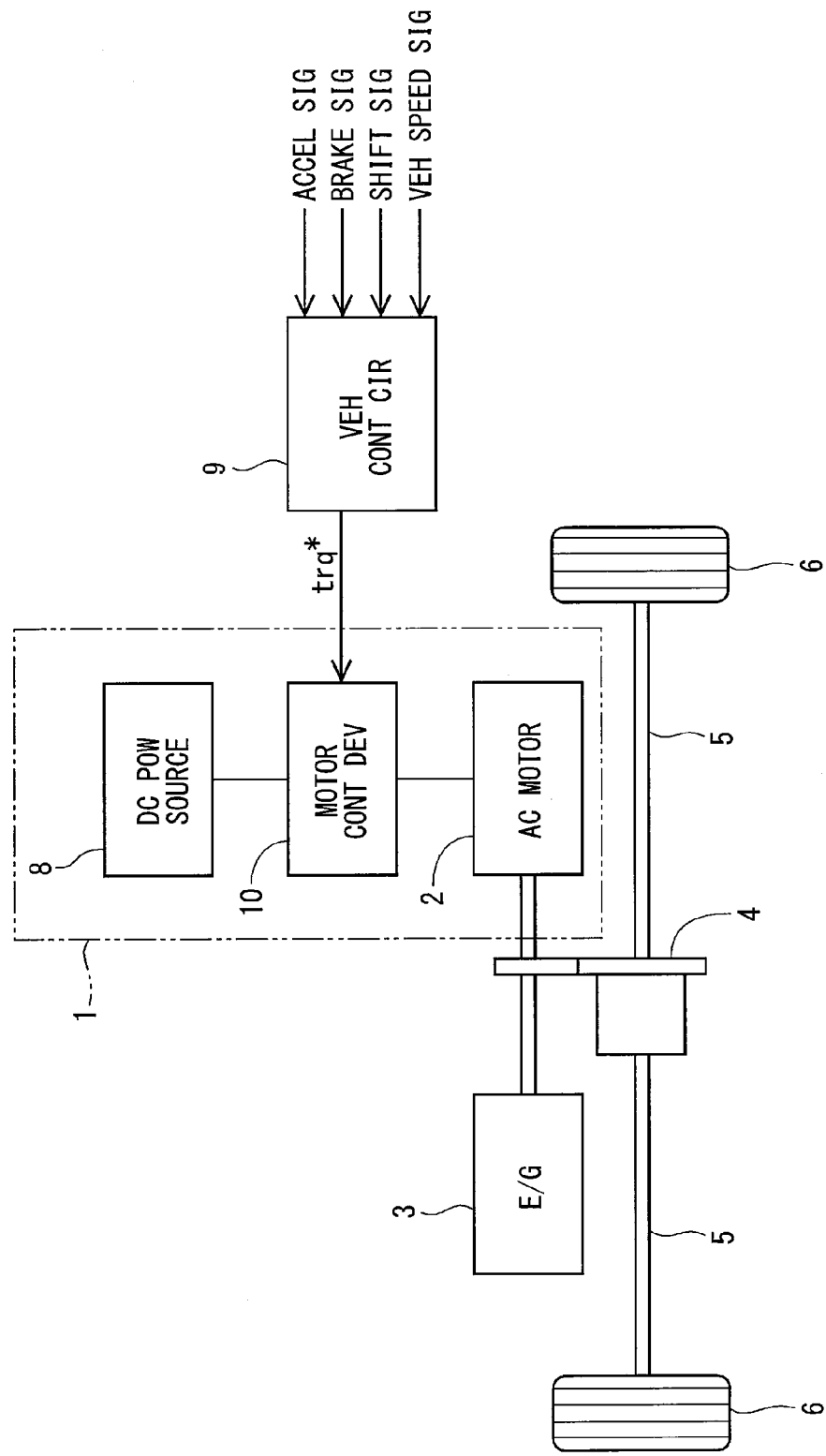
FIG. 1 is a schematic diagram to show a construction of an AC motor drive system of a first embodiment of the present disclosure.

Hereinafter, a control device of an AC motor according to the present disclosure will be described on the basis of the drawings. In this regard, hereinafter in a plurality of embodiments, the substantially same constructions will be denoted by the same reference characters and their descriptions will be omitted.

First Embodiment

As shown in FIG. 1, an electric motor control device 10 as a control device of an AC motor 2 according to a first embodiment of the present disclosure is applied to an electric motor drive system 1 for driving an electric vehicle.

The electric motor drive system 1 includes an AC motor 2, a DC power source 8, the electric motor control device 10, and the like.

The AC motor 2 is, for example, an electric motor for generating torque for driving the driving wheels 6 of the electric vehicle. The AC motor 2 of the present embodiment is a three phase AC motor of a permanent magnet synchronous type.

It is assumed that the electric vehicle includes a vehicle for driving the driving wheels 6 by electric energy such as a hybrid automobile, an electric automobile, and a vehicle powered by a fuel battery. The electric vehicle of the present embodiment is a hybrid vehicle provided with an engine 3, and the AC motor 2 is a so-called motor generator (designated by "MG" in the drawing) having a function as an electric motor that generates torque for driving the driving wheels 6 and a function as a generator that is driven by the kinetic energy of the vehicle, which is transmitted from the engine 3 and the driving wheels 6, and that can generate electricity.

The AC motor 2 is coupled to an axle 5 via a gear 4, for example, a transmission. In this way, the torque generated by the drive of the AC motor 2 rotates the axle 5 via the gear 4 to thereby drive the driving wheels 6.

The DC power source 8 is an electricity storage device that can charge and discharge electricity, for example, a secondary battery such as a nickel metal hydride battery or a lithium ion battery, and an electric double-layer capacitor. The DC power source 8 is connected to an inverter 12 (see FIG. 2) of the electric motor control device 10, that is, the DC power source 8 is so constructed as to supply electricity to the AC motor 2 and to be supplied with electricity from the AC motor 2 via the inverter 12.

A vehicle control circuit 9 is constructed of a microcomputer and the like and is provided therein with a CPU, a ROM, an I/O, and a bass line for connecting these elements, all of which are not shown in the drawings. The vehicle control circuit 9 controls the whole of the electric vehicle by software processing, which is performed by executing previously stored programs by the CPU, and by hardware processing, which is performed by a dedicated electronic circuit.

The vehicle control circuit 9 is so constructed as to be able to acquire signals from various kinds of sensors and switches such as an accelerator signal from an accelerator sensor, a brake signal from a brake switch, and a shift signal from a shift switch, all of which are not shown in the drawings. Further, the vehicle control circuit 9 detects a driving state of the vehicle on the basis of these acquired signals and outputs a torque command value trq* responsive to the driving state to the electric motor control device 10. Further, the vehicle control circuit 9 outputs a command signal to an engine control circuit (not shown) for controlling the drive of the engine 3.

Figure 2:
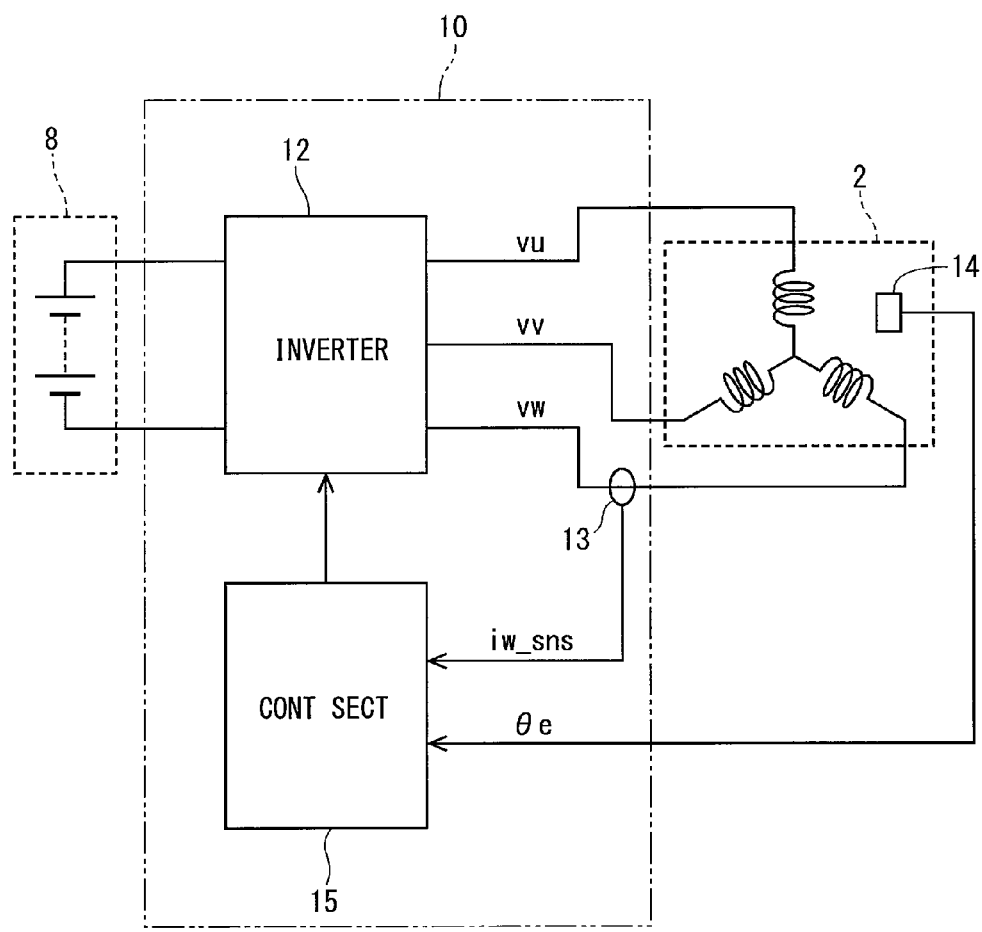
FIG. 2 is a schematic diagram to show a construction of an electric motor control device of the first embodiment of the present disclosure.

As shown in FIG. 2, the electric motor control device 10 includes the inverter 12 and a control section 15.

The inverter 12 has an inverter input voltage VH impressed thereon according to the drive state of the AC motor 2 and to a vehicle request, the inverter input voltage VH being a voltage to which a DC voltage of the DC power source 8 is boosted by a boost converter (not shown). The inverter 12 has six switching elements (not shown) connected in a bridge mode. In more detail, the switching elements are made of upper switching elements (hereinafter referred to as "upper SW") provided on a high electric potential side and lower switching elements (hereinafter referred to as "lower SW") provided on a low electric potential side. The upper SW and the lower SW connected in series are provided in correspondence to the respective phases of the AC motor 2. As to the switching element, for example, an IGBT (Insulated Gate Bipolar Transistor), a MOS (Metal Oxide Semiconductor) transistor, and a bipolar transistor can be used for the switching element. The switching elements are switched on and off on the basis of PWM signals UU, UL, VU, VL, WU, WL outputted from a PWM signal generation part 28 (see FIG. 3) of the control section 15. In this way, the inverter 12 controls three phase AC voltages vu, w, vw to be impressed on the AC motor 2. When the AC motor 2 has the three phase AC voltages vu, w, vw, which are generated by the inverter 12, impressed thereon, the AC motor has its drive controlled.

In the present embodiment, when a state where the upper SW is on and where the lower SW is off is switched to a state where the upper SW is off and where the lower SW is on or when a state where the upper SW is off and where the lower SW is on is switched to a state where the upper SW is on and where the lower SW is off, in order to prevent an upper/lower short circuit caused by that the upper SW and the lower SW are switched on at the same time, there is set a dead time period Tdt in which both of the upper SW and the lower SW are switched off. The dead time period Tdt is set in advance by a switching element design. The set dead time period Tdt is stored in a storage part (not shown) of the control section 15.

The current sensor 13 is provided in any one phase of the AC motor 2. In the present embodiment, the current sensor 13 is provided in the W phase and, hereinafter, the W phase in which the current sensor 13 is provided will be referred to as "a sensor phase". The current sensor 13 senses a W phase current sensed value iw_sns which is passed through the W phase of the sensor phase and outputs the W phase current sensed value iw_sns to the control section 15. The control section 15 acquires the W phase current sensed value iw_sns. In this regard, in the present embodiment, the current sensor 13 is provided in the W phase but may be provided in any phase. Hereinafter, in the present embodiment will be described a construction in which the sensor phase is the W phase.

A rotation angle sensor 14 is provided near a rotor (not shown) of the AC motor 2 and senses an electric angle θe and outputs a sensed electric angle θe to the control section 15. The control section 15 acquires the electric angle θe. The rotation angle sensor 14 of the present embodiment is a resolver. In addition, the rotation angle sensor 14 may be an other kind of sensor, for example, a rotary encoder.

Here, a drive control of the AC motor 2 will be described. According to the number of revolutions of the rotor of the AC motor 2 (hereinafter, simply referred to as "the number of revolutions N of the AC motor 2", as required) based on the electric angle θe sensed by the rotation angle sensor 14 and the torque command value trq* from the vehicle control circuit 9, the electric motor control device 10 drives the AC motor 2 as an electric motor to perform a powering operation, thereby consuming electricity, or drives the AC motor 2 as a generator to perform a regenerating operation, thereby generating electricity. Specifically, according to the number of revolutions N and whether the torque command value trq* is plus or minus, the electric motor control device 10 switches the operation of the AC motor 2 into the following four patterns:

<1. Normal rotation/powering operation> when the number of revolutions N is plus and the torque command value trq* is plus, the AC motor 2 consumes electricity;

<2. Normal rotation/regenerating operation> when the number of revolutions N is plus and the torque command value trq* is minus, the AC motor 2 generates electricity;

<3. Reverse rotation/powering operation> when the number of revolutions N is minus and the torque command value trq* is minus, the AC motor 2 consumes electricity; and <4. Reverse rotation/regenerating operation> when the number of revolutions N is minus and the torque command value trq* is plus, the AC motor 2 generates electricity.

When the number of revolutions N>0 (normal rotation) and the torque command value trq*>0, or the number of revolutions N<0 (reverse rotation) and the torque command value trq*<0, the inverter 12 converts the DC electricity supplied from the DC power source 8 to an AC electricity by the switching operation of the switching elements and supplies the AC electricity to the AC motor 2, thereby driving the AC motor 2 in such a way as to output torque (to perform a powering operation).

On the other hand, when the number of revolutions N>0 (normal rotation) and the torque command value trq*<0, or the number of revolutions N<0 (reverse rotation) and the torque command value trq*>0, the inverter 12 converts the AC electricity generated by the AC motor 2 to a DC electricity by the switching operation of the switching elements and supplies the DC electricity to the DC power source 8, whereby the AC motor 2 performs a regenerating operation.

Figure 3:
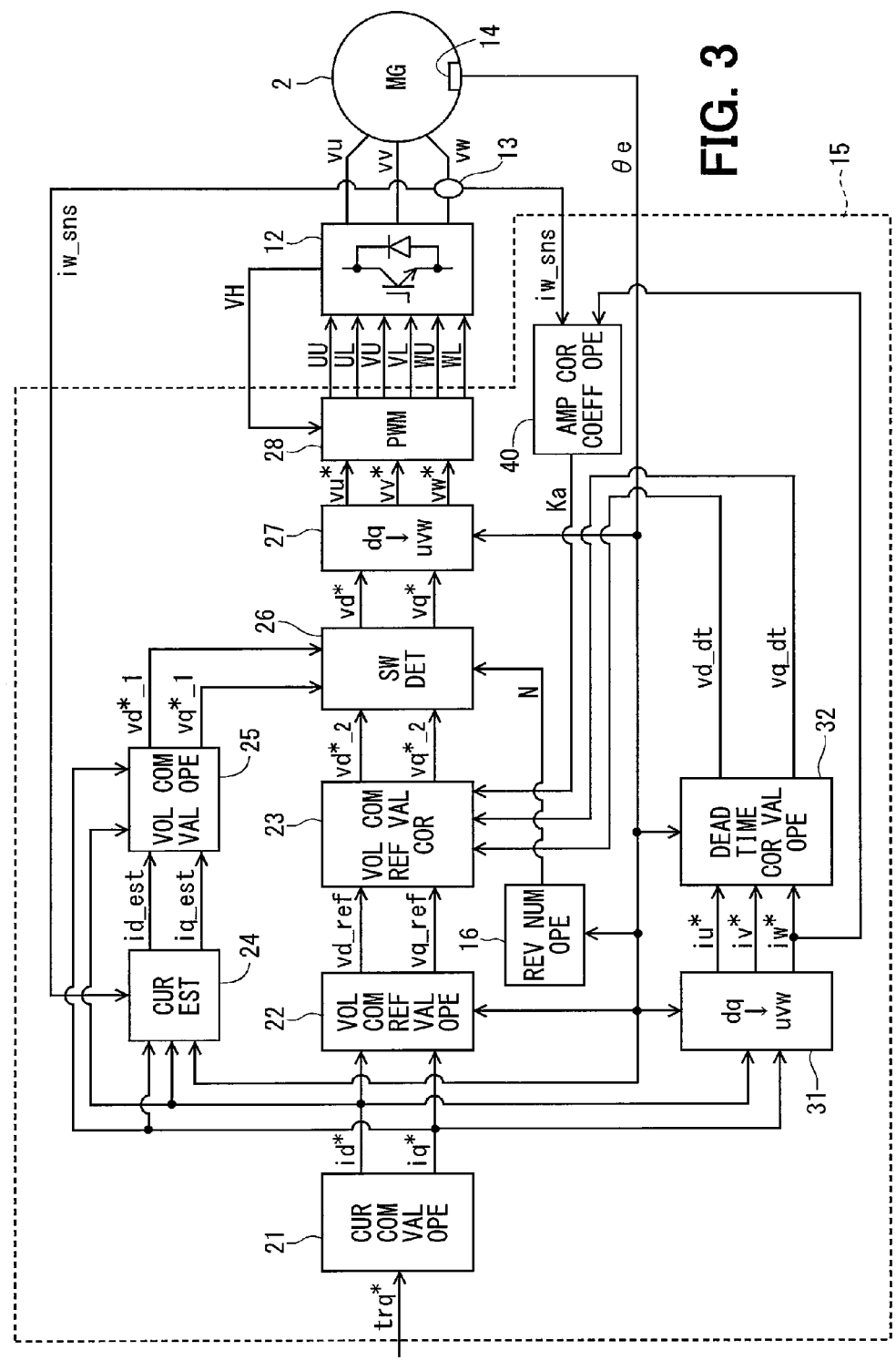
FIG. 3 is a block diagram to show a construction of a control section of the first embodiment of the present disclosure.

Next, the details of the control section 15 will be described on the basis of FIG. 3. As shown in FIG. 3, the control section 15 includes a number-of-revolutions operation part 16, a current command value operation part 21, a voltage command reference value operation part 22, a voltage command reference value correction part 23, a current estimation part 24, a voltage command value operation part 25, a switching determination part 26, a three phase voltage command value operation part 27, a PWM signal generation part 28, a three phase current command value operation part 31, a dead time correction value operation part 32, an amplitude correction coefficient operation part 40, and the like.

The number-of-revolutions operation part 16 operates the number of revolutions N of the AC motor 2 on the basis of the electric angle θe. The current command value operation part 21 operates a d axis current command value id* and a q axis current command value iq* in a rotating coordinate system (d-q coordinate system) set as the rotating coordinates of the AC motor 2 on the basis of the torque command value trq* acquired from the vehicle control circuit 9. In the present embodiment, the d axis current command value id* and the q axis current command value iq* are operated with reference to a map stored in advance but may be so constructed as to be operated by the use of a mathematical formula or the like.

The voltage command reference value operation part 22 operates a d axis voltage command reference value vd_ref and a q axis voltage command reference value vq_ref on the basis of the d axis current command value id* and the q axis current command value iq* by the use of a voltage equation that is a theoretical formula of an electric motor. The d axis voltage command reference value vd_ref and the q axis voltage command reference value vq_ref are directly operated from the d axis current command value id* and the q axis current command value iq* and can be also considered as a feed forward term (hereinafter, referred to as "FF)".

The voltage command reference value correction part 23 corrects the d axis voltage command reference value vd_ref and the q axis voltage command reference value vq_ref and operates a second d axis voltage command value vd*_2 and a second q axis voltage command value vq*_2.

A method for operating the d axis voltage command reference value vd_ref and the q axis voltage command reference value vq_ref in the voltage command reference value operation part 22 and a method for operating the second d axis voltage command value vd*_2 and the second q axis voltage command value vq*_2 in the voltage command reference value correction part 23 will be later described in detail.

The current estimation part 24 operates a d axis current estimated value id_est and a q axis current estimated value iq_est on the basis of the W phase current sensed value iw_sns and the electric angle θe. In the present embodiment, the current estimation part 24 operates the d axis current estimated value id_est and the q axis current estimated value iq_est on the basis of the d axis current command value id* and the q axis current command value iq* as well as the W phase current sensed value iw_sns and the electric angle θe. Specifically, the current estimation part 24 makes a U phase current command value iu* and a V phase current command value iv*, which are calculated by inversely dq transforming the d axis current command value id* and the q axis current command value iq*, a U phase current estimated value iu_est and a V phase current estimated value iv_est. Then, the current estimation part 24 *dq* transforms the U phase current estimated value iu_est, the V phase current estimated value iv_est, and the W phase current sensed value iw_sns to operate the d axis current estimated value id_est and the q axis current estimated value iq_est.

A method for operating the d axis current estimated value id_est and the q axis current estimated value iq_est is not limited to this method, but any method may be employed which operates the d axis current estimated value id_est and the q axis current estimated value iq_est on the basis of the W phase current sensed value iw_sns and the electric angle θe. Further, the U phase current estimated value iu_est and the V phase current estimated value iv_est may be operated by any method or do not need to be operated if they are not required for the operation of the d axis current estimated value id_est and the q axis current estimated value iq_est.

The voltage command value operation part 25 operates a d axis current deviation Δid that is a difference between the d axis current estimated value id_est, which is fed back from the current estimation part 24, and the d axis current command value id* and operates a first d axis voltage command value vd*_1 by an PI operation in such a way that the d axis current deviation Δid converges to 0 [A] so as to make the d axis current estimated value id_est follow the d axis current command value id*. Further, the voltage command value operation part 25 operates a q axis current deviation Δiq that is a difference between the q axis current estimated value iq_est, which is fed back from the current estimation part 24, and the q axis current command value iq* and operates a first q axis voltage command value vq*_1 by the PI operation in such a way that the q axis current deviation Δiq converges to 0 [A] so as to make the q axis current estimated value iq_est follow the q axis current command value iq*.

The switching determination part 26 switches between the selection of the first d axis voltage command value vd*_1 and the first q axis voltage command value vq*_1 as the d axis voltage command value vd* and the q axis voltage command value vq* and the selection of the second d axis voltage command value vd*_2 and the second q axis voltage command value vq*_2 as the d axis voltage command value vd* and the q axis voltage command value vq*, the d axis voltage command value vd* and the q axis voltage command value vq* being used for the operation of drive signals (PWM signals UU, UL, VU, VL, WU, WL to be described later) relating to the drive of the inverter 12. In the present embodiment, when the number of revolutions N is more than a given switching determination threshold value A, the switching determination part 26 selects the first d axis voltage command value vd*_1 and the first q axis voltage command value vq*_1 as the d axis voltage command value vd* and the q axis voltage command value vq*. Further, when the number of revolutions N is not more than the given switching determination threshold value A, the switching determination part 26 selects the second d axis voltage command value vd*_2 and the second q axis voltage command value vq*_2 as the d axis voltage command value vd* and the q axis voltage command value vq*. Hereinafter, an operation of generating a drive signal relating to the drive of the inverter 12 on the basis of the first d axis voltage command value vd*_1 and the first q axis voltage command value vq*_1 and of controlling the drive of the AC motor 2 will be referred to as "an estimated current feedback control (hereinafter, feedback will be described as "FB", as required). The estimated current FB control can also be considered as one phase control using a current sensed value of one phase (W phase current sensed value iw_sns in the present embodiment). Further, an operation of generating a drive signal relating to the drive of the inverter 12 on the basis of the second d axis voltage command value vd*_2 and the second q axis voltage command value vq*_2 and of controlling the drive of the AC motor 2 will be referred to as "an FF voltage command control (hereinafter, referred to as "an FF control", as required). In the present embodiment, "an estimated current FB control mode" corresponds to "a first control mode" and "an FF voltage command control (FF control) mode" corresponds to "a second control mode". Here, in the present embodiment, considering that the current sensor is provided in one phase, "the estimated current FB control" and "the FF control" can also be considered as one phase control in the broad sense of term.

In the present embodiment, it can also be considered that the estimated current FB control and the FF control are switched between them on the basis of the number of revolutions N, that is, the control mode is switched on the basis of the number of revolutions N. In more detail, when the number of revolutions N is more than a determination threshold value A, the estimated current FB control mode is performed and when the number of revolutions N is not more than the determination threshold value A, the FF control mode is performed.

The three phase voltage command value operation part 27 inversely dq transforms the d axis voltage command value vd* and the q axis voltage command value vq* to a U phase voltage command value vu*, a V phase voltage command value vv*, and a W phase voltage command value vw* on the basis of the electric angle θe acquired from the rotation sensor 14.

The PWM signal generation part 28 operates the PWM signals UU, UL, VU, VL, WU, WL relating to the switching on and off of the switching elements of the inverter 12 on the basis of the voltage command values vu*, vv*, vw* of a three-phase alternating current and an inverter input voltage VH that is voltage impressed on the inverter 12.

Then, when the switching elements of the inverter 12 are switched on and off on the basis of the PWM signals UU, UL, VU, VL, WU, WL, the three phase AC voltages vu, w, vw are generated, and when the three phase AC voltages vu, w, vw are impressed on the AC motor 2, the drive of the AC motor 2 is controlled in such a way that torque according to the torque command value trq* is outputted. Here, the three phase AC voltages vu, w, vw correspond to "an impressed voltage".

The three phase current command value operation part 31 inversely dq transforms the d axis current command value id* and the q axis current command value iq* to a U phase current command value iu*, a V phase current command value iv*, and a W phase current command value iw* on the basis of the electric angle θe. Hereinafter, the U phase current command value iu*, the V phase current command value iv*, and the W phase current command value iw* will be referred to as "three phase current command values iu*, iv*, iw*", as required.

The dead time correction value operation part 32 operates a d axis dead time correction value vd_dt and a q axis dead time correction value vq_dt which correspond to a voltage error caused when the upper SW and the lower SW are switched off in the dead time period Tdt.

The amplitude correction coefficient operation part 40 operates an amplitude correction coefficient Ka on the basis of the W phase current sensed value iw_sns and the W phase current command value iw*.

The d axis dead time correction value vd_dt, the q axis dead time correction value vq_dt, and the amplitude correction coefficient Ka will be later described in detail.

Figure 4A:
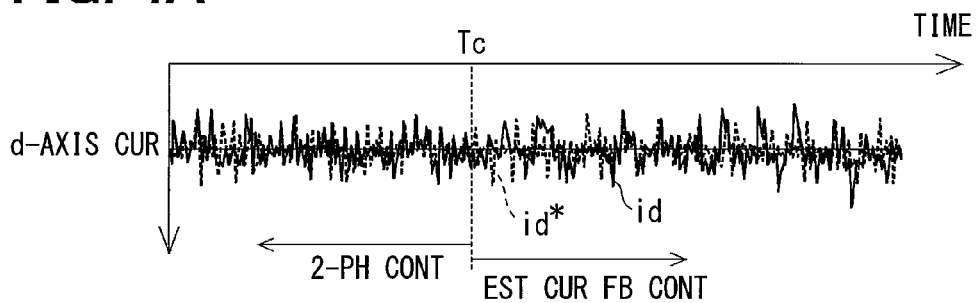
FIGS. 4A, 4B, and 4C are time charts to illustrate a movement of an AC motor in a high rotation range.
Figure 4B:
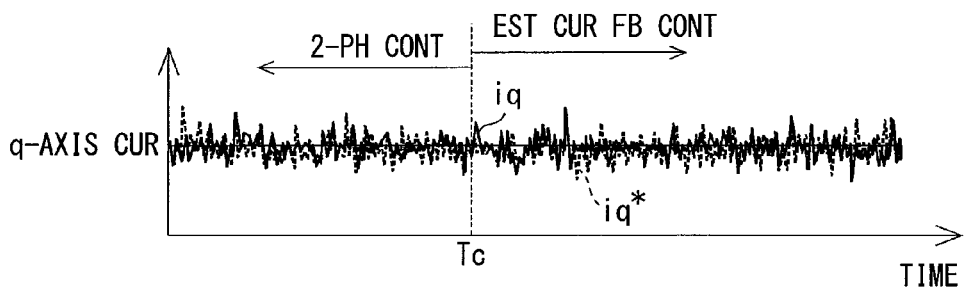
Figure 4C:
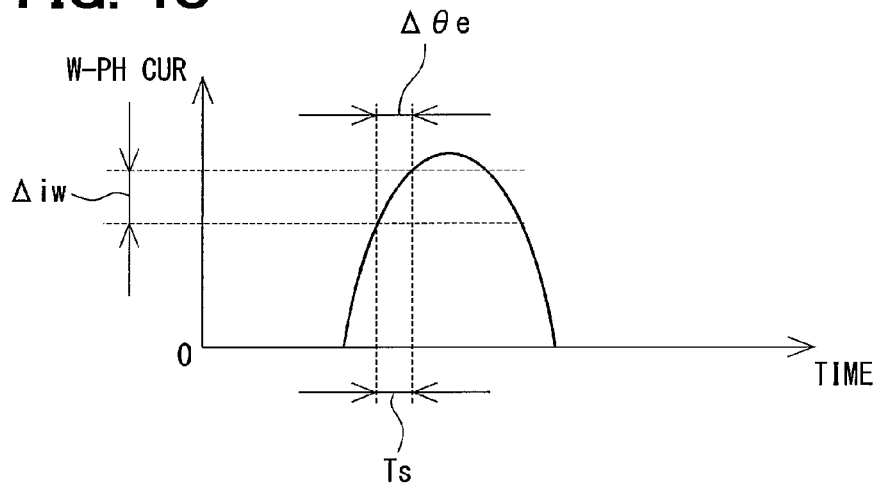
Figure 5A:
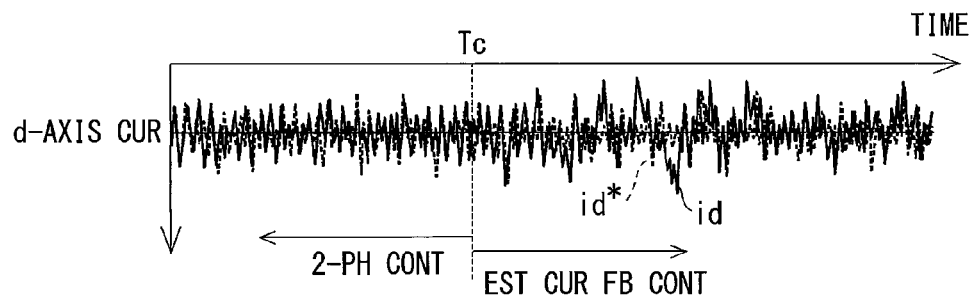
FIGS. 5A, 5B, and 5C are time charts to illustrate a movement of an AC motor in a middle rotation range.
Figure 5B:
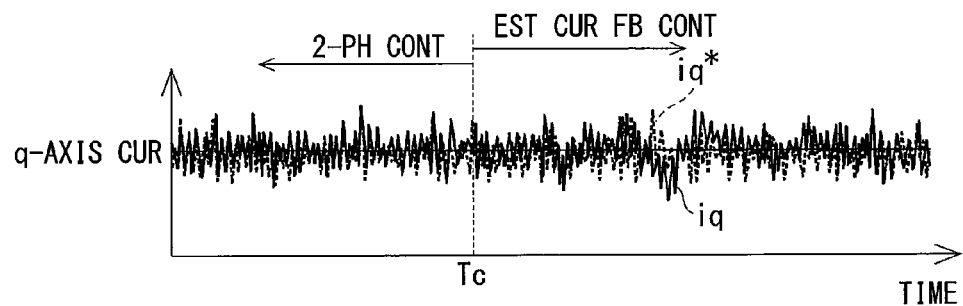
Figure 5C:
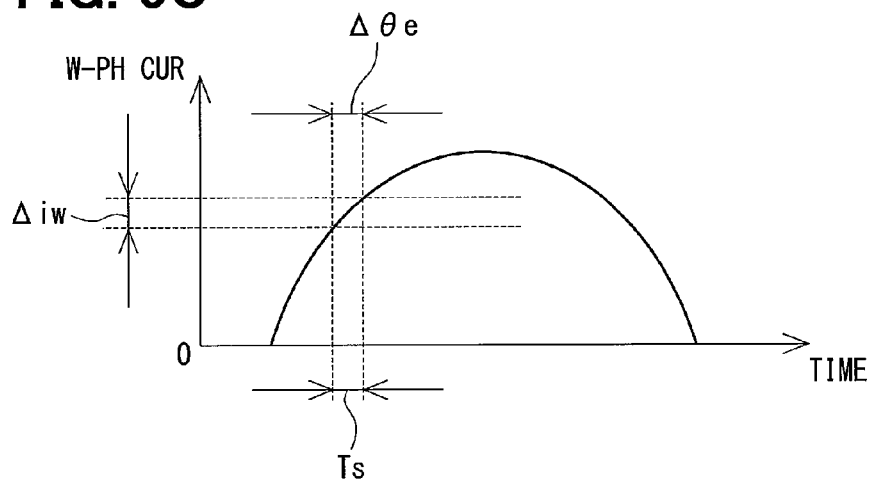
Figure 6A:
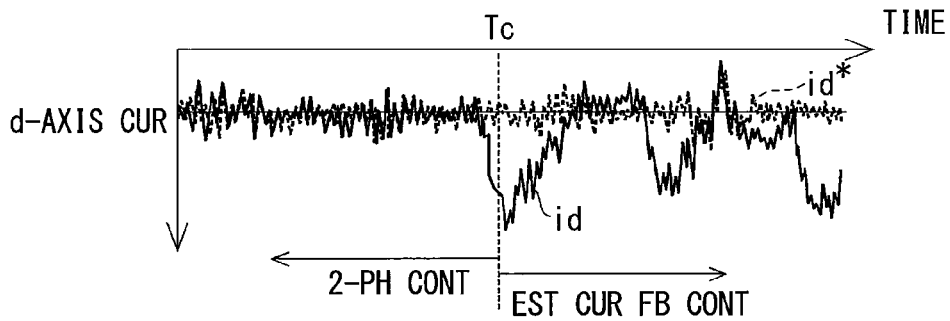
FIGS. 6A, 6B, and 6C are time charts to illustrate a movement of an AC motor in a low rotation range.
Figure 6B:
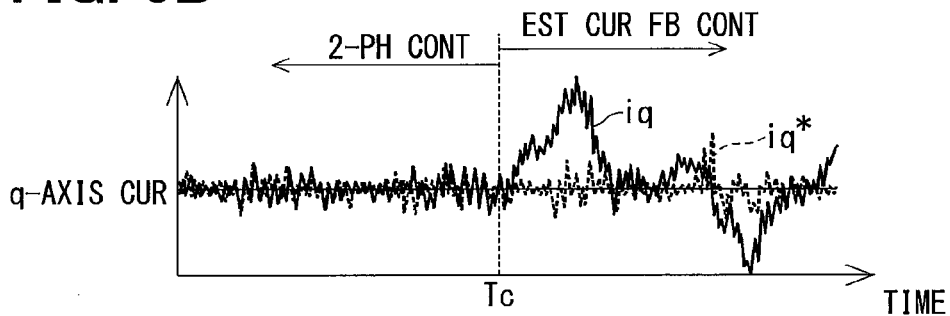
Figure 6C:
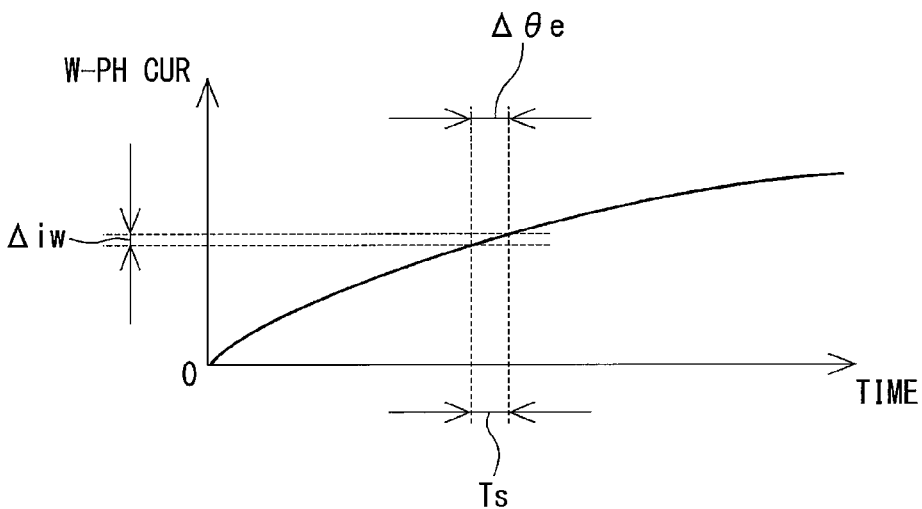

Here, the estimated current FB control mode will be described on the basis of FIGS. 4A, 4B, 4C to FIGS. 6A, 6B, 6C. FIGS. 4A, 4B, 4C are examples of a high rotation range, FIGS. 5A, 5B, 5C are examples of a middle rotation range, and FIGS. 6A, 6B, 6C are examples of a low rotation range. Here, "the high rotation, the middle rotation, and the low rotation" are used only in a comparative meaning and do not mean a specific number of revolutions. In other words, when it is assumed that: the number of revolutions in FIGS. 4A, 4B, 4C is N1; the number of revolutions in FIGS. 5A, 5B, 5C is N2; and the number of revolutions in FIGS. 6A, 6B, 6C is N3, the relationship among N1, N2, and N3 is simply N1≥N2≥N3. Further, in FIGS. 4A to 4C to FIGS. 6A to 6C, a sampling interval Ts is assumed to be the same. In FIGS. 4A, 4B, 4C to FIGS. 6A, 6B, 6C, FIGS. 4A, 5A, and 6A illustrate a d axis current, FIGS. 4B, 5B, and 6B illustrate a q axis current, and FIGS. 4C, 5C, and 6C illustrate a relationship between an electric angle movement Δθe and a current change Δiw and a sampling interval Ts. Further, in FIGS. 4A, 5A, and 6A and FIGS. 4B, 5B, and 6B, a d axis actual current value id and a q axis actual current value iq are denoted by a solid line, whereas a d axis current command value id* and a q axis current command value iq* are denoted by a broken line. Still further, each of FIGS. 4A, 5A, and 6A and FIGS. 4B, 5B, and 6B shows a case where a two phase control based on the current sensed values of two phases each of which has the current sensor provided therein is performed in a first step before a time Tc and where the two phase control is switched to an estimated current FB control based on the current sensed value of one phase (the current sensed value iw_sns of the W phase in the present embodiment) at the time Tc.

As shown in FIGS. 4A and 4B, when the two phase control is switched to the estimated current FB control in a high rotation range in which the number of revolutions N is high, a d axis actual current value id and a q axis actual current value iq in the estimated current FB control is not much different in a fluctuation range from the d axis actual current value id and the q axis actual current value iq in the two phase control.

This is because of the following: as shown in FIG. 4C, when the sampling interval Ts is the same irrespective of the number of revolutions N, the electric angle movement Δθe and the current change Δiw at the sampling interval Ts become comparatively large values and hence easily reflect actual information also in the estimated current FB control.

On the other hand, as shown in FIGS. 5A and 5B, when the two phase control is switched to the estimated current FB control in the middle rotation range in which the number of revolutions is middle, the d axis actual current value id and the q axis actual current value iq in the estimated current FB control is larger in the fluctuation range from the d axis actual current value id and the q axis actual current value iq in the two phase control and hence the control becomes unstable.

This is because of the following: as shown in FIG. 5C, the electric angle movement Δθe and the current change Δiw at the sampling interval Ts become smaller than those in the high rotation range in which the number of revolutions N is high and hence actual information becomes scarce.

Further, as shown in FIGS. 6A and 6B, when the two phase control is switched to the estimated current FB control in the low rotation range, the d axis actual current value id and the q axis actual current value iq in the estimated current FB control are further larger in the fluctuation range than those when the number of revolutions N is in the middle rotation range and hence the control becomes more unstable.

As shown in FIG. 6C, when the number of revolutions N is small, the electric angle movement Δθe and the current change Δiw at the sampling interval Ts become close to zero. This is because of the following: in the present embodiment, the U phase current command value iu* is used as the U phase current estimated value iu_est and the V phase current command value iv* is used as the V phase current estimated value iv_est, so that when the current change Δiw of a value varied for a command becomes 0 [A] approximately, the d axis current estimated value id_est and the q axis current estimated value iq_est, which are fed back, are hardly varied.

In this way, when the number of revolutions N is in the low rotation range, the electric angle movement Δθe and the current change Δiw at the sampling interval Ts become small. In other words, actual information reflected to the d axis current estimated value id_est and the q axis current estimated value iq_est, which are fed back, become scarce. For this reason, the d axis current estimated value id_est and the q axis current estimated value iq_est, which are fed back, are reduced in an estimation accuracy, so that when the estimated current FB control is performed in the low rotation range, the AC motor 2 may not be able to be stably driven.

Hence, in the present embodiment, when the number of revolutions N is not more than the given switching determination threshold value A, an FF control based on the second d axis voltage command value vd*_2 and the second q axis voltage command value vq*_2, in each of which an FF term is corrected, is performed in place of the estimated current FB control.

The d axis voltage command reference value vd_ref and the q axis voltage command reference value vq_ref, which are operated by the voltage command reference value operation part 22, will be described.

First, a voltage equation of an electric motor is generally expressed by the following equations (1.1), (1.2).

$$vd = Ra \times id + Ld \times (d/dt) \times id - \omega \times Lq \times iq \qquad (1.1)$$

$$vq = Ra \times iq + Lq \times (d/dt) \times iq + \omega \times Ld \times id + \omega \times \psi \qquad (1.2)$$

Further, when a time differential term (d/dt) expressing a transient property is neglected and, in the equation (1.1), the d axis voltage command reference value vd_ref is used as vd and the d axis voltage command value id* is used as id and, in the equation (1.2), the q axis voltage command reference value vq_ref is used as vq and the q axis voltage command value iq* is used as iq, the equations (1.1), (1.2) are rewritten by (2.1), (2.2).

$$vd\_ref = Ra \times id^* - \omega \times Lq \times iq^* \qquad (2.1)$$

$$vq\_ref = Ra \times iq^* + \omega \times Ld \times id^* + \omega \times \psi \qquad (2.2)$$

Reference characters in the equations are as follows.
Ra: armature resistance
Ld, Lq: d axis self-inductance, q axis self-inductance
ω: electric angular velocity
ψ: armature interlinkage flux of permanent magnet In this regard, the armature resistance Ra, the d axis self-inductance Ld, the q axis self-inductance Lq, and the armature interlinkage flux ψ of a permanent magnet, which are machine constants of the AC motor 2, may be set at fixed values or may be calculated by calculation. Further, values close to actual characteristics and actual measured values of the machine constants may be expressed in a map and the machine constants may be operated on the basis of the torque command value trq* (or the d axis current command value id* and the q axis current command value iq*).

The electric angular velocity ω is operated by the voltage command reference value operation part 22 on the basis of the electric angle θe. Further, the electric angular velocity ω may be operated from the number of revolutions N.

Here, when the number of revolutions is 0 [rpm], the electric angular velocity ω also becomes 0 [rad/s] and hence ω terms in the equations (2.1), (2.2) become zero. Hence, the d axis voltage command reference value vd_ref and the q axis voltage command reference value vq_ref, which are operated by the voltage command reference value operation part 22, have only resistance terms left, as shown in equations (3), (4).

$$vd\_ref = Ra \times id^* \qquad (3)$$

$$vq\_ref = Ra \times iq^* \qquad (4)$$

Figure 7A:
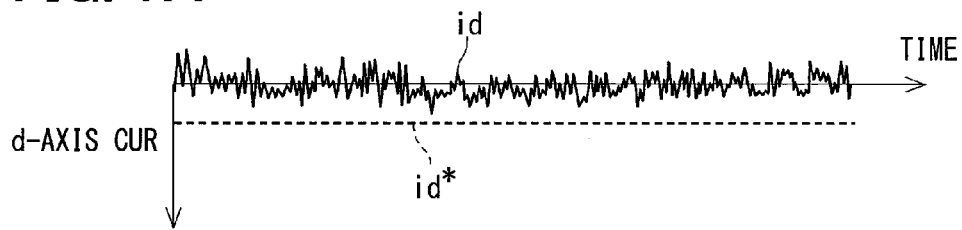
FIGS. 7A, 7B, 7C, and 7D are time charts to illustrate a movement of an AC motor when control is performed on the basis of a voltage command reference value when the number of revolutions of an AC motor is 0 [rpm]
Figure 7B:
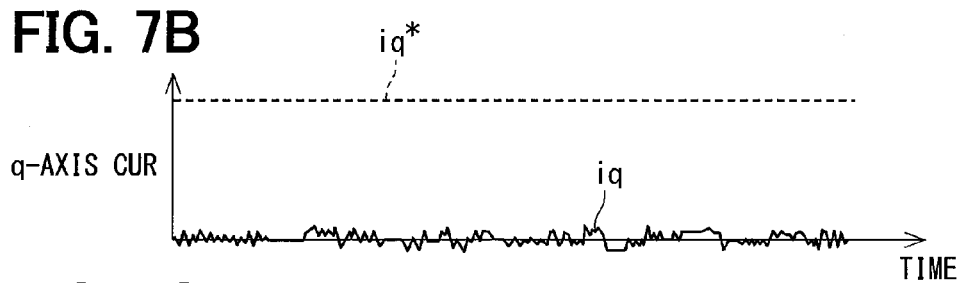

As shown in the equations (3), (4), when the number of revolutions N is 0 [rpm], the d axis voltage command reference value vd_ref and the q axis voltage command reference value vq_ref are values based on the armature resistance Ra. Hence, depending on the value of the armature resistance Ra and the current command value, the d axis voltage command reference value vd_ref and the q axis voltage command reference value vq_ref become small values. Further, there is a case where a theoretical voltage command reference value calculated from the voltage equation is made different from a voltage command value relating to the actual drive of the AC motor 2, which generates torque according to the command, by a physical factor and the like relating to the AC motor 2 and the electric motor control device 10. For this reason, when the AC motor 2 is controlled on the basis of the d axis voltage command reference value vd_ref and the q axis voltage command reference value vq_ref, which are calculated from the voltage equation, as shown in FIGS. 7A and 7B, a d axis actual current value id and a q axis actual current value iq, which are passed through the AC motor 2, become nearly 0 [A]. Hence, torque necessary for actually driving the AC motor 2 is not generated and hence the AC motor 2 cannot be started.

Figure 8A:
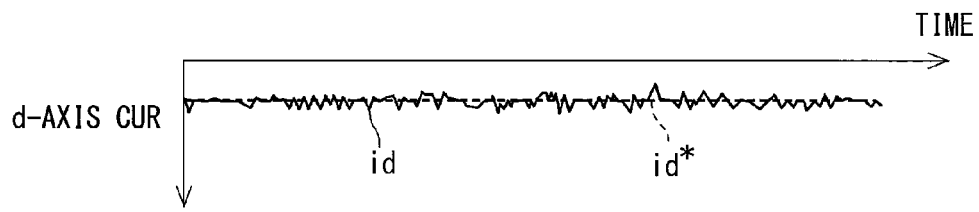
FIGS. 8A, 8B, 8C, and 8D are time charts to illustrate a movement of an AC motor when a two phase control is performed when the number of revolutions of an AC motor is 0 [rpm]
Figure 8B:
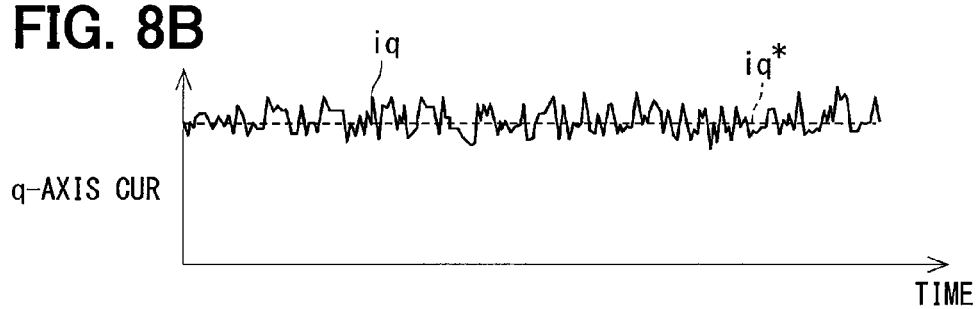
Figure 8C:
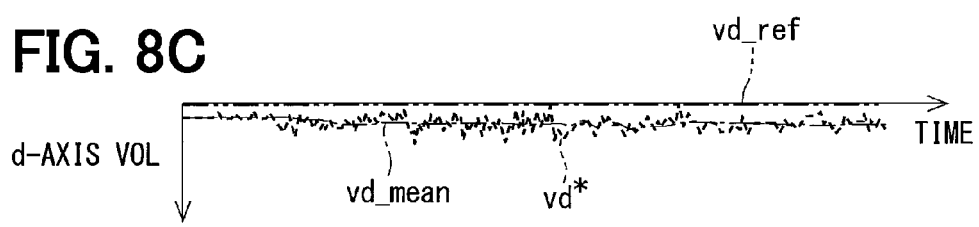
Figure 8D:
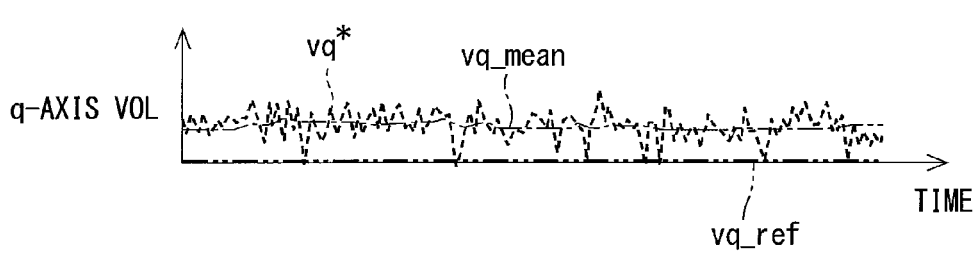

In this regard, when the current sensors are provided in two phases and when a feedback control (2 phase control) is performed on the basis of the current sensed values of two phases when the number of revolutions N is 0 [rpm], as shown in FIGS. 8C and 8D, voltages based on the d axis voltage command value vd* and a q axis voltage command value vq*, which are larger in absolute values than the d axis voltage command reference value vd_ref and the q axis voltage command reference value vq_ref, are impressed on the AC motor 2, whereby the d axis actual current value id and the q axis actual current value iq, which correspond to the d axis current command value id* and the q axis current command value iq*, are passed through the AC motor 2.

Figure 7C:
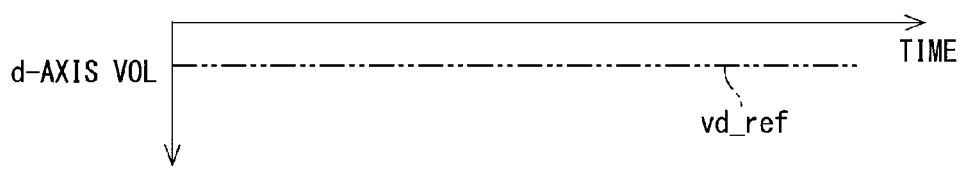
Figure 7D:
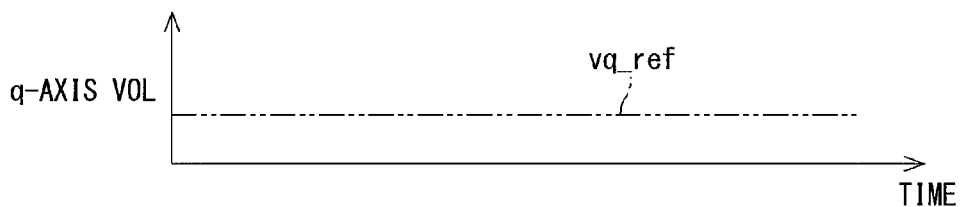

In this regard, in FIGS. 7A to 7D and FIGS. 8A to 8D, FIGS. 7A and 8A show a d axis current, FIGS. 7B and 8B show a q axis current, FIGS. 7C and 8C show a d axis voltage, and FIGS. 7D and 8D show a q axis voltage. Further, in FIGS. 7A and 8A and FIGS. 7B and 8B, a solid line shows a d axis actual current value id and a q axis actual current value iq, whereas a broken line shows a d axis current command value id* and a q axis current command value iq*. Still further, in FIGS. 7C and 8C and FIGS. 7D and 8D, a broken line shows a d axis voltage command value vd* and a q axis voltage command value vq*, which are operated when a two phase control is performed, and a single dot & dash line shows a mean value vd_mean of the d axis voltage command value vd* and a mean value vq_mean of the q axis voltage command value vq*, and a double dot & dash line shows a d axis voltage command reference value vd_ref and a q axis voltage command reference value vq_ref. In order to clearly illustrate the d axis voltage command reference value vd_ref and the q axis voltage command reference value vq_ref, FIGS. 7C and 7D are shown in a state enlarged in a longitudinal direction as compared with FIGS. 8C and 8D.

Here, when a d axis voltage command value vd* and a q axis voltage command value vq*, which are impressed on the AC motor 2 in the two phase control, are applied to the voltage equation in the state where the number of revolutions N is 0 [rpm], the d axis voltage command value vd* and the q axis voltage command value vq* are expressed by the following equations (5), (6).

$$vd^* = Ra \times id^* + vd\_cmp \quad (5)$$

$$vq^* = Ra \times iq^* + vq\_cmp \quad (6)$$

That is, in the two phase control, the voltage command values are increased by the feedback control until currents corresponding to the d axis current command value id* and the q axis current command value iq* are passed. For this reason, it can also be considered that a d axis voltage command correction value vd_cmp and a q axis voltage command correction value vq_cmp are generated by the feedback control. It can be considered that each of the d axis voltage command correction value vd_cmp and the q axis voltage command correction value vq_cmp corresponds to a difference between a theoretical voltage command reference value calculated from the voltage equation and the voltage command value relating to the actual drive of the AC motor 2, which generates torque according to the command.

In the meantime, in the present embodiment, in order to prevent an upper/lower short circuit caused when the upper SW and the lower SW of the inverter 12 are switched on at the same time, there is set the dead time period Tdt in which the upper SW and the lower SW are off. By setting the dead time period Tdt, there is a case where voltage actually impressed on the AC motor 2 is different from a theoretical value. The effect of a voltage error caused by the difference between the theoretical value and the actual value caused by the dead time period Tdt becomes larger as the rotation is lower and the torque is smaller.

Hence, in the present embodiment, considering that the d axis voltage command correction value vd_cmp and the q axis voltage command correction value vq_cmp in the equations (5) and (6) are caused by the voltage error by the dead time period Tdt, the dead time correction value operation part 32 calculates a d axis dead time correction value vd_dt and a q axis dead time correction value vq_dt and the voltage command reference value correction part 23 corrects the d axis voltage command reference value vd_ref and the q axis voltage command reference value vq_ref.

Here, the operation of the d axis dead time correction value vd_dt and the q axis dead time correction value vq_dt will be described on the basis of FIGS. 9A and 9B.

Figure 9A:
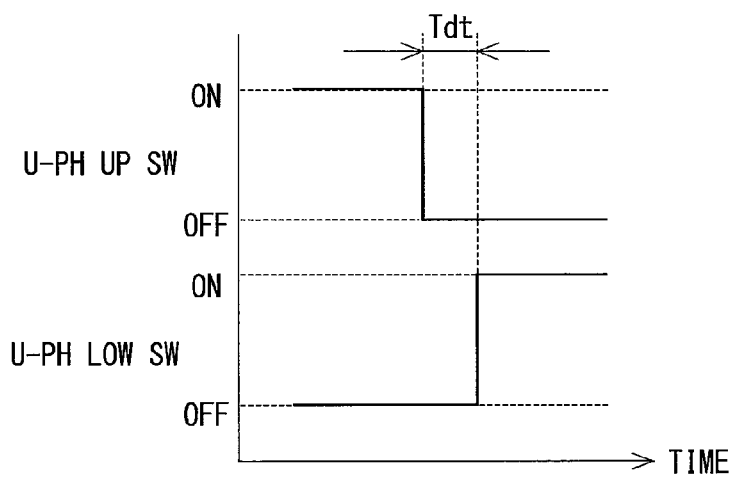
FIGS. 9A and 9B are time charts to illustrate a dead time correction according to the first embodiment of the present disclosure.

FIG. 9A shows the switching on and off of the upper SW and the lower SW corresponding to the U phase. As shown in FIG. 9A, when a state where the upper SW is on and where the lower SW is off is switched to a state where the upper SW is off and where the lower SW is on, in order to prevent the upper/lower short circuit caused by that the upper SW and the lower SW are switched on, there is set the dead time period Tdt in which both of the upper SW and the lower SW are switched off. The dead time period Tdt is set at a given value in advance by the switching element design. Here, this is ditto for the case where a state where the lower SW is on and where the upper SW is off is switched to a state where the lower SW is off and where the upper SW is on and for the V phase and the W phase other than the U phase.

The dead time correction values vu_dta, vv_dta, vw_dta of the respective phases are expressed by the following equation (7). fc in the equation (7) is a frequency of a triangle wave used for generating a PWM signal and VH is an inverter input voltage.

$$vu\_dta = vv\_dta = vw\_dta = Tdt \times fc \times VH \quad (7)$$

Figure 9B:
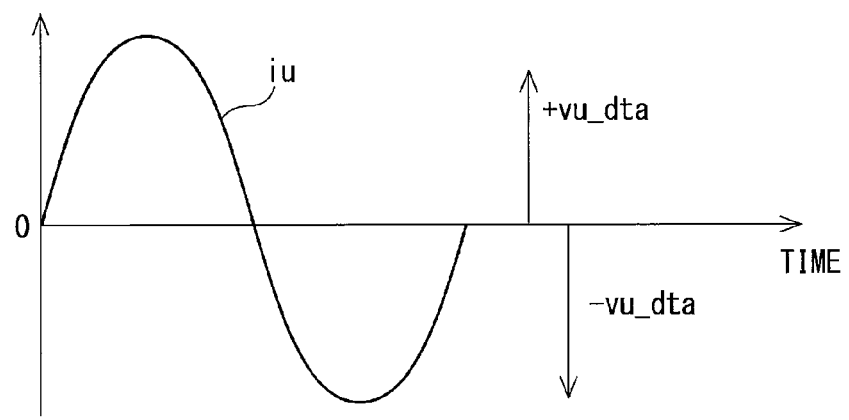

Further, as show in FIG. 9B, when the U phase current iu is plus, the dead time correction values vu_dta is added to the U phase current iu, whereas the U phase current iu is minus, the dead time correction values vu_dta is subtracted from the U phase current iu. This is ditto for the V phase and the W phase.

In the present embodiment, the V phase and the W phase do not have the current sensor provided therein, so that it cannot be determined whether the currents of the respective phases (in particular, the U phase and the W phase) are plus or minus. Hence, in the present embodiment, the three phase current command value operation part 31 operates the three phase current command values iu*, iv*, iw* and determines on the basis of the three phase current command values iu*, iv*, iw* whether the currents of the respective phases are plus or minus. In other words, "whether the dead time correction value is plus or minus is determined on the basis of whether the current command value of each phase is plus or minus".

Specifically, when the U phase current command value iu* is plus, it is set that the U phase dead time correction value vu_dt=vu_dta, whereas when the U phase current command value iu* is minus, it is set that the U phase dead time correction value vu_dt=−vu_dta. Further, when the V phase current command value iv* is plus, it is set that the V phase dead time correction value vv_dt=vv_dta, whereas when the V phase current command value iv* is minus, it is set that the V phase dead time correction value vv_dt=−vv_dta. Still further, when the W phase current command value iw* is plus, it is set that the W phase dead time correction value vw_dt=vw_dta, whereas when the W phase current command value iw* is minus, it is set that the W phase dead time correction value vw_dt=−vw_dta.

Then, the U phase dead time correction value vu_dt, the V phase dead time correction value vv_dt, and the W phase dead time correction value vw_dt are dq transformed to a d axis dead time correction value vd_dt and a q axis dead time correction value vq_dt on the basis of the electric angle θe.

The calculated d axis dead time correction value vd_dt is added to the d axis voltage command reference value vd_ref and the calculated q axis dead time correction value vq_dt is added to the q axis voltage command reference value vq_ref, whereby the voltage necessary for starting the AC motor 2 can be ensured and hence the drive of the AC motor 2 can be started from a state where the AC motor 2 is stopped. Similarly, the drive of the AC motor 2 can be finished from a state where the AC motor is driven, whereby the AC motor 2 can be stopped.

In the meantime, an actual dead time in which the upper SW and the lower SW are switched off is likely to be varied from the dead time period Tdt set in advance. Further, the machines constant used for the operation of the voltage equation are likely to include errors. Hence, in the present embodiment, in consideration of the variations in the dead time and the errors of the machine constants, correction is further made.

In the present embodiment, when the number of revolutions N is in a low rotation range, in particular, 0 [rpm], a voltage phase is assumed to be nearly equal to a current command phase and a voltage amplitude is corrected on the basis of the W phase current command value iw* and the W phase current sensed value iw_sns.

Here, a voltage amplitude correction will be conceptually described by taking a case where the number of revolutions N is 0 [rpm] as an example.

Figure 10A:
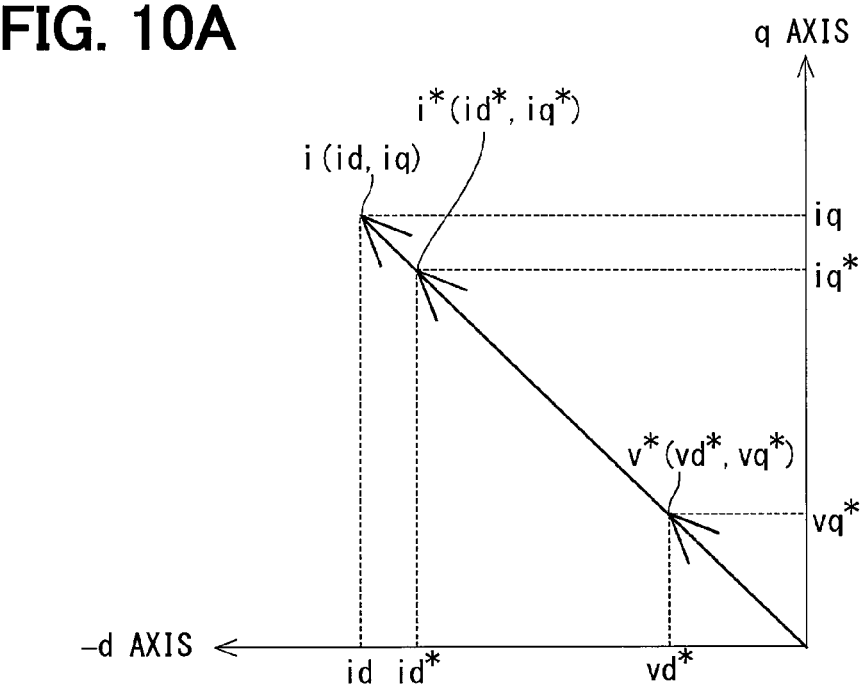
FIGS. 10A and 10B are graphs to illustrate an amplitude correction according to the first embodiment of the present disclosure.
Figure 10B:
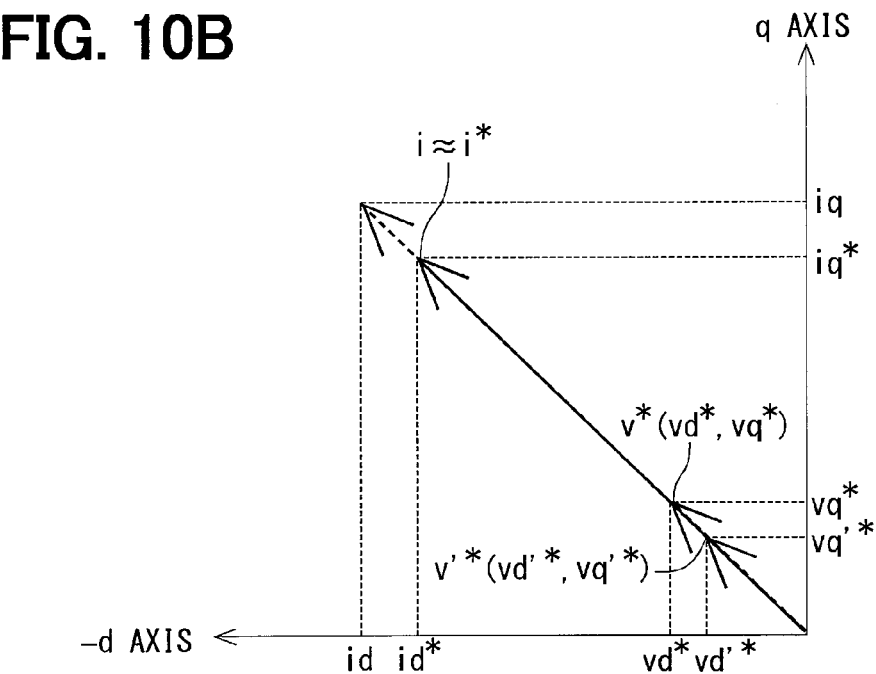

As shown in FIG. 10A, when voltage corresponding to a voltage command vector v* (vd*, vq*) based on a certain current command vector i* (id*, iq*) is impressed on the AC motor 2, it is assumed that a current vector i (id. iq) of current actually passed through the AC motor 2 is different from the current command vector i* (id*, iq*). Here, as shown in FIG. 10B, the voltage command vector v* (vd*, vq*) is multiplied by a ratio of the current command vector i* (id*, iq*) to an amplitude of the current vector i (id. iq) of the current actually passed through the AC motor 2 to thereby operate a corrected voltage command vector v'* (vd'*, vq'*), and voltage corresponding to the corrected voltage command vector v'* (vd'*, vq'*) is impressed on the AC motor 2. In this way, the current vector i (id, iq) of the current actually passed through the AC motor 2 can be brought close to the current command vector i* (id*, iq*).

As shown in FIG. 3, the present embodiment is provided with the amplitude correction coefficient operation part 40. The amplitude correction coefficient operation part 40 calculates an amplitude correction coefficient Ka that is a ratio of the W phase current command value iw* to the W phase current sensed value iw_sns. The amplitude correction coefficient Ka is shown in an equation (8).

$$Ka = iw^*/iw\_sns \quad (8)$$

When the amplitude correction coefficient Ka is operated, in order to avoid an operation accuracy from being reduced by so-called "zero multiplication" of multiplying something by zero or by so-called "zero division" of dividing something by zero, in the case where the W phase current command value iw* and the W phase current sensed value iw_sns are near 0 [A], that is, the W phase current command value iw* and the W phase current sensed value iw_sns are in a given range including 0 [A], it is desirable to interpolate the amplitude correction coefficient Ka. Hence, in the present embodiment, the amplitude correction coefficient Ka is fixed, for example, at 1. Here, when it is determined that the W phase current command value iw* and the W phase current sensed value iw_sns are within the given range including 0 [A], the amplitude correction coefficient Ka may not only be fixed at 1 but also take over, for example, the last value. In this way, a method for interpolating the amplitude correction coefficient Ka is not limited to a specific method. In addition, it is also recommended to set an upper limit and a lower limit for the amplitude correction coefficient Ka in such a way that the amplitude correction coefficient Ka is within a given range including, for example, 1.

The voltage command reference correction part 23 corrects the d axis voltage command reference value vd_ref and the q axis voltage command reference value vq_ref by the use of the d axis dead time correction value vd_dt and the q axis dead time correction value vq_dt, which are operated by the dead time correction value operation part 32, and the amplitude correction coefficient Ka, which is operated by the amplitude correction coefficient operation part 40, thereby operating a second d axis voltage command value vd*_2 and a second q axis voltage command value vq*_2. The second d axis voltage command value vd*_2 and the second q axis voltage command value vq*_2 will be shown by equations (9) and (10).

$$vd^*\_2 = Ka \times (vd\_ref + vd\_dt) \quad (9)$$

$$vq^*\_2 = Ka \times (vq\_ref + vq\_dt) \quad (10)$$

Figure 11:
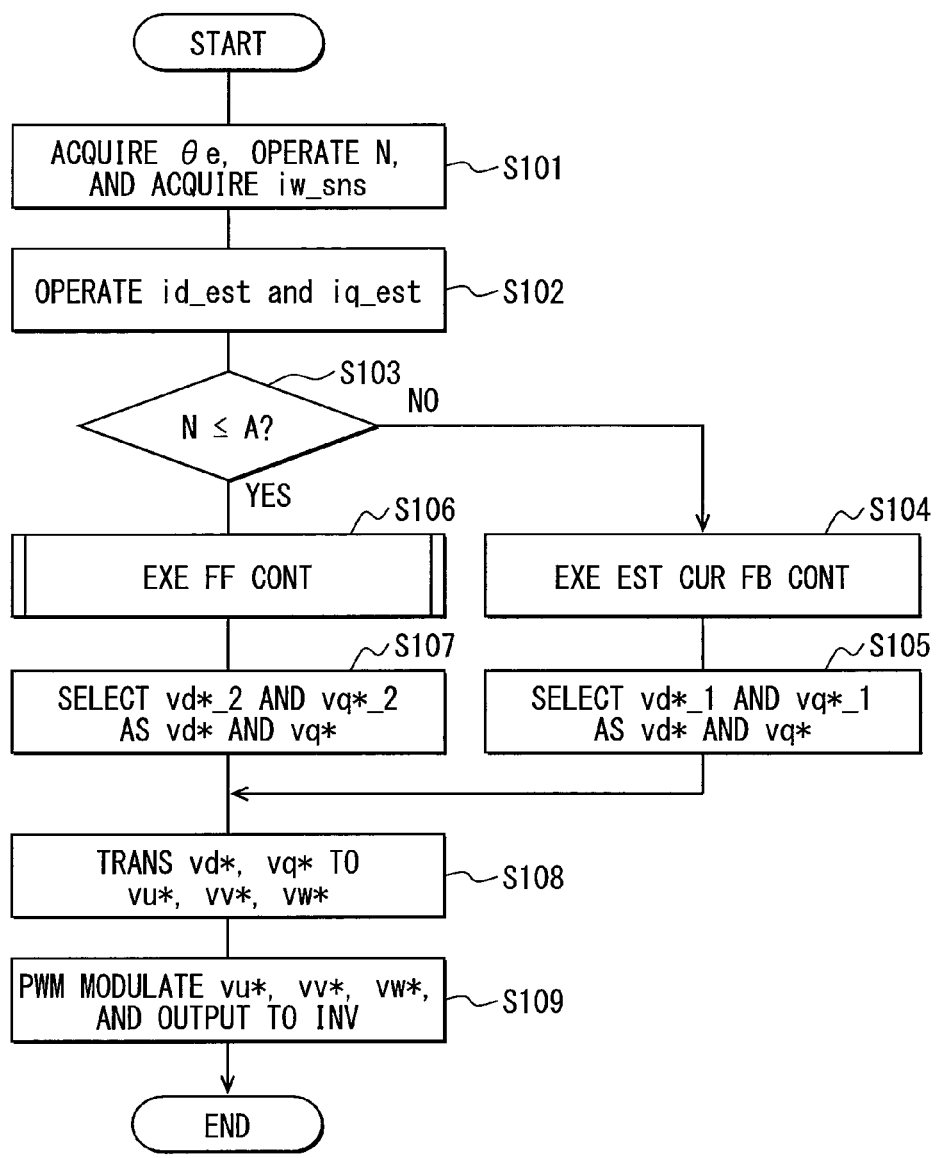
FIG. 11 is a flow chart to show drive control processing according to the first embodiment of the present disclosure.
Figure 12:
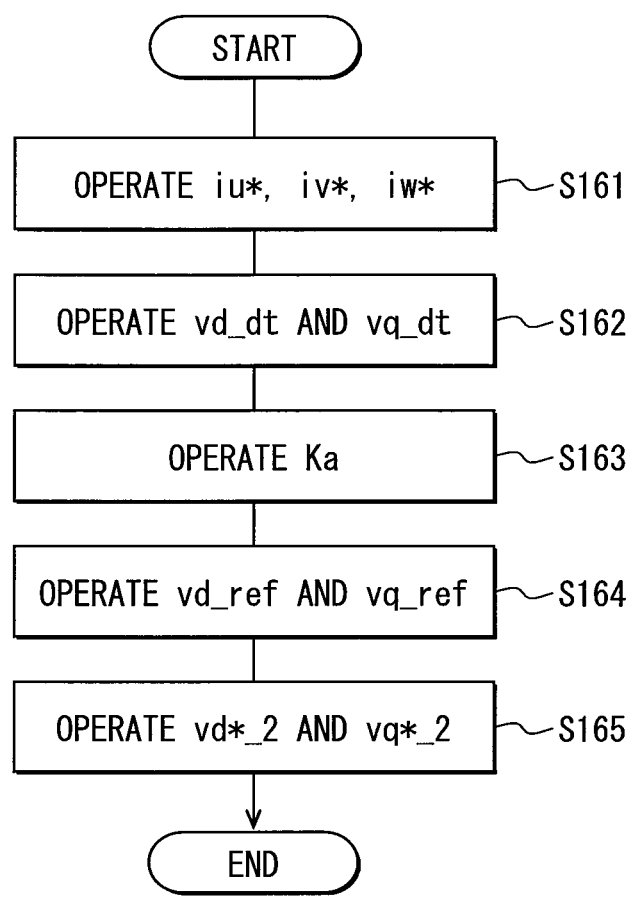
FIG. 12 is a flow chart to show FF control processing according to the first embodiment of the present disclosure.

Here, drive control processing of the AC motor 2 according to the present embodiment will be described on the basis of a flow chart shown in FIG. 11 and FIG. 12. The processing shown in FIG. 11 and FIG. 12 is performed by the control section 15. Further, FIG. 12 is a subordinate flow for describing FF control processing in FIG. 11.

As shown in FIG. 11, in a first step S101 (hereinafter, "step" is omitted and is simply designated by "S"), the electric angle θe is acquired from the rotation angle sensor 14 and the number of revolutions N is operated. Further, the W phase current sensed value iw_sns is acquired from the current sensor 13.

In S102, the current estimation part 24 operates the d axis current estimated value id_est and the q axis current estimated value iq_est on the basis of the W phase current sensed value iw_sns and the electric angle θe. In the present embodiment, the current estimation part 24 operates the d axis current estimated value id_est and the q axis current estimated value iq_est on the basis of the d axis current command value id* and the q axis current command value iq* as well as the W phase current sensed value iw_sns and the electric angle θe. That is, in the present embodiment, the current estimation part 24 always operates the d axis current estimated value id_est and the q axis current estimated value iq_est irrespective of the number of revolutions N.

In S103, it is determined whether or not the number of revolutions N is not more than a given switching determination threshold value A. When it is determined that the number of revolutions N is not more than the switching determination threshold value A (S103: YES), the routine proceeds to S106. When it is determined that the number of revolutions N is more than the switching determination threshold value A (S103: NO), the routine proceeds to S104.

In S104, the estimated current FB control is performed and the voltage command value operation part 25 operates the first d axis voltage command value vd*_1 and the first q axis voltage command value vq*_1 on the basis of the d axis current command value id* and the q axis current command value iq* and the d axis current estimated value id_est and the q axis current estimated value iq_est. Here, when an affirmative determination is made in S103 of the processing just before S104, that is, when the FF control is performed until just before, it is desirable that in the PI operation, the last d axis voltage command value vd* and the last q axis voltage command value vq* are set as initial values of a PI integral term. In this way, when FF term correction processing is switched to estimated current FB control processing, it is possible to prevent the d axis voltage command value vd* and the q axis voltage command value vq* from being suddenly changed.

In S105, the first d axis voltage command value vd*_1 is selected as the d axis voltage command value vd* and the first q axis voltage command value vq*_1 is selected as the q axis voltage command value vq*.

In S106 to which the routine proceeds when the number of revolutions N is not more than the switching determination threshold value A (S103: YES), the FF control is performed in place of the estimated FB control.

Here, FF control processing in S106 will be described on the basis of a flow chart shown in FIG. 12.

In S161, the three phase current command value operation part 31 operates three phase current command values iu*, iv*, iw* on the basis of the d axis current command value id*, the q axis current command value iq*, and the electric angle θd.

In S162, the dead time correction value operation part 32 operates the d axis dead time correction value vd_dt and the q axis dead time correction value vq_dt.

In S163, the amplitude correction coefficient operation part 40 operates the amplitude correction coefficient Ka.

In S164, the voltage command reference value operation part 22 operates the d axis voltage command reference value vd_ref and the q axis voltage command reference value vq_ref by the use of a voltage equation on the basis of the d axis current command value id* and the q axis current command value iq*.

In S165, the voltage command reference value correction part 23 corrects the d axis voltage command reference value vd_ref and the q axis voltage command reference value vq_ref on the basis of the d axis dead time correction value vd_dt and the q axis dead time correction value vq_dt and the amplitude correction coefficient Ka to thereby operate the second d axis voltage command value vd*_2 and the second q axis voltage command value vq*_2 (see equations (9) and (10)).

Returning to FIG. 11, in S107 to which the routine proceeds after S106, the second d axis voltage command value vd*_2 is selected as the d axis voltage command value vd* and the second q axis voltage command value vq*_2 is selected as the q axis voltage command value vq*.

In S108, the three phase voltage command value operation part 27 inversely dq transforms the d axis voltage command value vd* and the q axis voltage command value vq* on the basis of the electric angle θe to thereby operate three phase voltage command values vu*, vv*, vw*.

In S109, the PWM signal generation part 28 PWM modulates the three phase voltage command values vu*, vv*, vw* on the basis of the inverter input voltage VH to thereby calculate PWM signals UU, UL, VU, VL, WU, WL and outputs the PWM signals UU, UL, VU, VL, WU, WL to the inverter 12.

Then, the switching elements of the inverter 12 are switched on and off on the basis of the PWM signals UU, UL, VU, VL, WU, WL, whereby the three phase AC voltages vu, w, vw are generated. The three phase AC voltages vu, w, vw are impressed on the AC motor 2, whereby the torque according to the torque command value trq* is outputted by the AC motor 2.

Figure 13A:
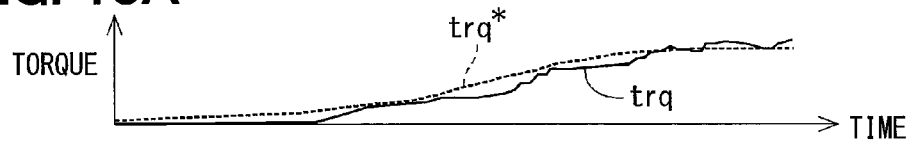
FIGS. 13A to 13G are time charts to illustrate a movement of an AC motor when the FF control processing according to the first embodiment of the present disclosure is performed.
Figure 13B:
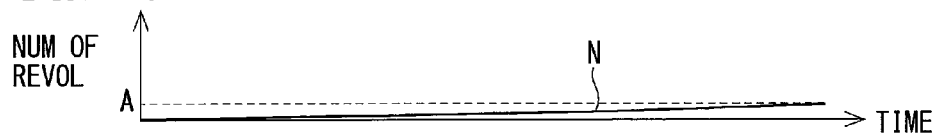
Figure 13C:
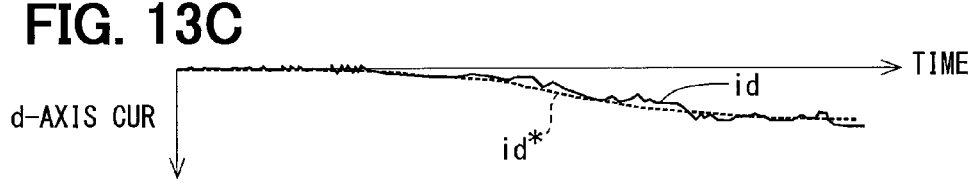
Figure 13D:
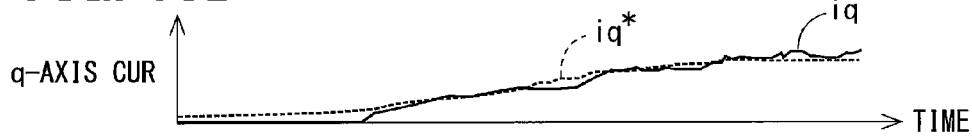
Figure 13E:
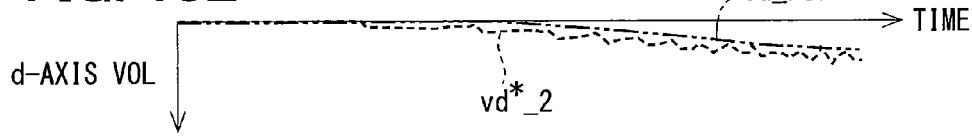
Figure 13F:
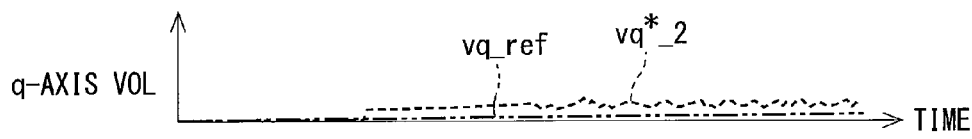
Figure 13G:
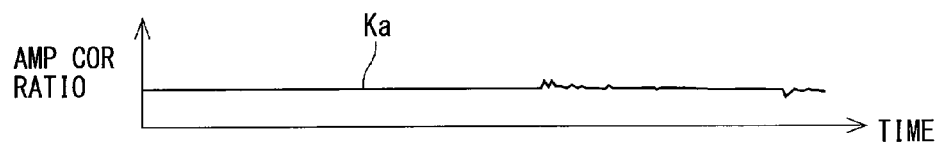
Figure 14A:
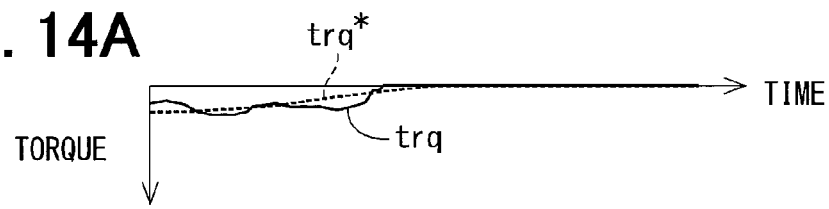
FIGS. 14A to 14G are time charts to illustrate a movement of an AC motor when the FF control processing according to the first embodiment of the present disclosure is performed.
Figure 14B:
Figure 14C:
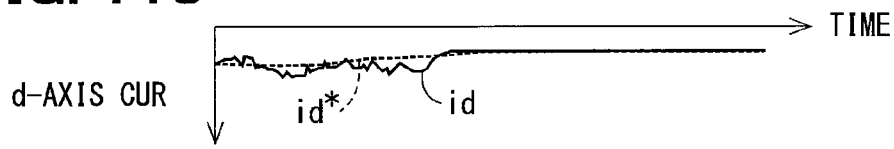
Figure 14D:
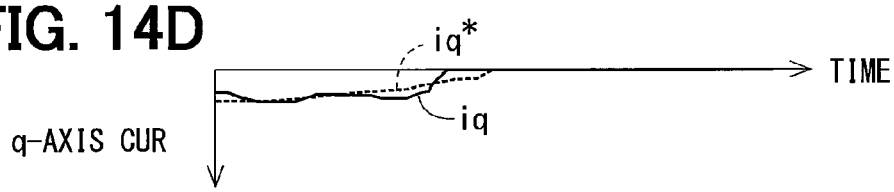
Figure 14E:
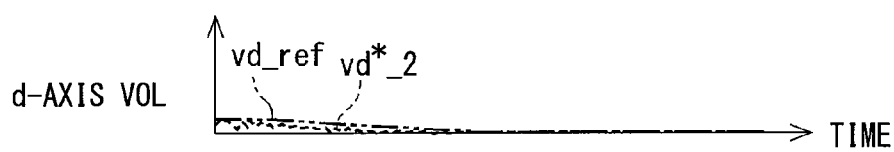
Figure 14F:
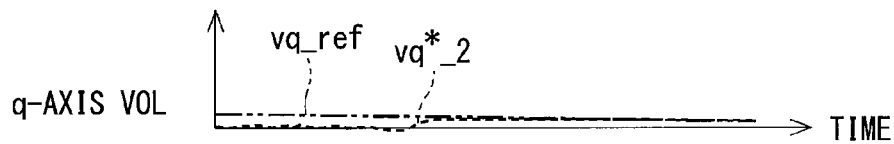
Figure 14G:
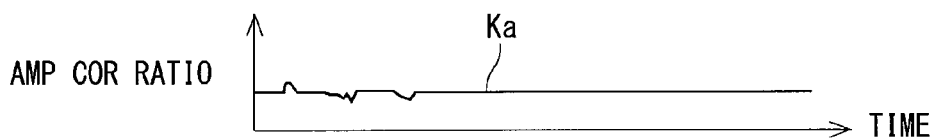

FIGS. 13A to 13G show the movement of the AC motor 2 from a state where the AC motor 2 is stopped, that is, the number of revolutions N is 0 [rpm] to a state where the AC motor 2 is started by the FF control and where the number of revolutions N reaches the determination threshold value A [rpm]. Further, FIGS. 14A to 14G show the movement of the AC motor 2 from a state where the number of revolutions N is the determination threshold value A [rpm] to a state where the AC motor 2 is stopped by the FF control. In FIGS. 13A to 13G and FIGS. 14A to 14G, FIGS. 13A and 14A show the torque, FIGS. 13B and 14B show the number of revolutions, FIGS. 13C and 14C show the d axis current, FIGS. 13D and 14D show the q axis current, FIGS. 13E and 14E show the d axis voltage, FIGS. 13F and 14F show the q axis voltage, and FIGS. 13G and 14G show the amplitude correction coefficient. Further, in FIGS. 13A and 14A, FIGS. 13C and 14C, and FIGS. 13D and 14D, a solid line shows the actual torque value trq, the d axis actual current value id, or the q axis actual current value iq, whereas a broken line shows the torque command value trq*, the d axis current command value id*, or the q axis current command value iq*. Still further, in FIGS. 13E and 14E and FIGS. 13F and 14F, a broken line shows the second d axis voltage command value vd*_2 or the second q axis voltage command value vq*_2, whereas a double dot & dash line shows the d axis voltage command reference value vd_ref or the q axis voltage command reference value vq_ref.

As shown in FIG. 13E, in the low rotation range in which the number of revolutions N is less than the determination threshold value A, the second d axis voltage command value vd*_2 is larger as an absolute value than the d axis voltage command reference value vd_ref which is not yet corrected by the d axis dead time correction value vd_dt and the amplitude correction coefficient Ka. Similarly, as shown in 13F, the second q axis voltage command value vq*_2 is larger as an absolute value than the q axis voltage command reference value vq_ref which is not yet corrected by the q axis dead time correction value vq_dt and the amplitude correction coefficient Ka.

By impressing the three phase AC voltages vu, w, vw, which are based on the second d axis voltage command value vd*_2 and the second q axis voltage command value vq*_2 which are corrected by the d axis dead time correction value vd_dt, the q axis dead time correction value vq_dt, and the amplitude correction coefficient Ka, on the AC motor 2, as shown in FIGS. 13C and 13D, the d axis actual current value id and the q axis actual current value iq, which are nearly equal to the d axis current command value id* and the q axis current command value iq*, are passed through the AC motor 2. Further, as shown in FIG. 13A, the actual torque value trq which is nearly equal to the torque command value trq* is outputted by the AC motor 2. Still further, as shown in FIG. 13B, the number of revolutions N is increased from 0 [rpm] to the determination threshold value A [rpm]. That is, the AC motor 2 can be stably started from a stop state where the number of revolutions N is 0 [rpm]. Similarly, as shown in FIG. 14B, the AC motor 2 can be stably stopped from a state where the number of revolutions N is the determination threshold value A approximately according to the command.

In this way, in the low rotation range, the AC motor 2 can be appropriately started, driven, and stopped by performing the FF control.

As described above in detail, the electric motor control device 10 of the present embodiment controls the drive of the three phase AC motor 2 having the impressed voltages vu, w, vw controlled by the inverter 12.

In the control section 15 of the electric motor control device 10, the following processing is performed. The W phase current sensed value iw_sns is acquired from the first current sensor 13 provided in the sensor phase of any one phase (W phase in the present embodiment) of the AC motor 2 (S101 in FIG. 11). Further, the electric angle θe is acquired from the rotation angle sensor 14 for sensing the rotation angle of the AC motor 2 (S101).

The current estimation part 24 operates the d axis current estimated value id_est and the q axis current estimated value iq_est on the basis of the W phase current sensed value iw_sns and the electric angle θe (S102). In the present embodiment, the current estimation part 24 operates the d axis current estimated value id_est and the q axis current estimated value iq_est on the basis of the d axis current command value id* and the q axis current command value iq* in addition to the W phase current sensed value iw_sns and the electric angle θe. Further, the voltage command value operation part 25 operates the first d axis voltage command value vd*_1 and the first q axis voltage command value vq*_1 on the basis of the d axis current command value id* and the q axis current command value iq*, which relate to the drive of the AC motor 2, and the d axis current estimated value id_est and the q axis current estimated value iq_est, which are fed back (S104).

The voltage command reference value operation part 22 operates the d axis voltage command reference value vd_ref and the q axis voltage command reference value vq_ref on the basis of the d axis current command value id* and the q axis current command value iq* by the use of the theoretical formula of the electric motor (S164). The voltage command reference value correction part 23 corrects the d axis voltage command reference value vd_ref and the q axis voltage command reference value vq_ref and operates the second d axis voltage command value vd*_2 and the second q axis voltage command value vq*_2 (S165).

The number-of-revolutions operation part 16 operates the number of revolutions N of the AC motor 2 on the basis of the electric angle θe (S101).

The switching determination part 26 switches between the estimated current FB control mode for generating the PWM signals UU, UL, VU, VL, WU, WL relating to the drive of the inverter 12 on the basis of the first d axis current voltage value vd*_1 and the first q axis voltage command value vq*_1 and the FF control mode for generating the PWM signals UU, UL, VU, VL, WU, WL on the basis of the second d axis voltage command value vd*_2 and the second q axis voltage command value vq*_2.

In the present embodiment, when the number of revolutions N is more than the given determination threshold value A (S103: NO), the estimated current FB control mode is performed, whereas when the number of revolutions N is not more than the given determination threshold value A (S103: YES), the FF control mode is performed. Specifically, when the number of revolutions N is more than the given determination threshold value A (S103: NO), the switching determination part 26 selects the first d axis voltage command value vd*_1 and the first q axis voltage command value vq*_1 as the d axis voltage command value vd* and the q axis voltage command value vq* (S105). Further, when the number of revolutions N is not more than the given determination threshold value A (S103: YES), the switching determination part 26 selects the second d axis voltage command value vd*_2 and the second q axis voltage command value vq*_2 as the d axis voltage command value vd* and the q axis voltage command value vq* (S107).

In the present embodiment, the first current sensor 13 is provided in the W phase and the current sensors of the U phase and the W phase are omitted, in other words, the number of current sensors can be reduced. In this way, the construction near the three phase output terminals of the inverter 12 can be reduced in size and the cost of the electric motor control device 10 can be reduced.

When the estimated current FB control mode is performed that feeds back the d axis current estimated value id_est and the q axis current estimated value iq_est, which are estimated by the use of the current sensed value iw_sns of one phase (W phase in the present embodiment), to thereby control the drive of the AC motor 2, in the low rotation range in which the number of revolutions N is small, the electric angle movement Δθe and the current change Δiw per the sampling interval Ts become small and actual information becomes scarce, so that the control is likely to be made unstable.

For this reason, in the present embodiment, in the low rotation range in which the number of revolutions N is not more than the determination threshold value A, the d axis voltage command reference value vd_ref and the q axis voltage command reference value vq_ref are operated on the basis of the d axis current command value id* and the q axis current command value iq* by the use of the theoretical formula of the electric motor (for example, voltage equation) in place of the estimated current FB control. However, there is a case where a theoretical voltage command reference value, which is calculated from the theoretical formula of the electric motor, is made different from a voltage command value relating to the actual drive of the AC motor 2, which can produce torque according to the command, by a physical factor and the like relating to the AC motor 2 and the electric motor control device 10. In particular, when the drive of the AC motor 2 is controlled on the basis of the d axis voltage command reference value vd_ref and the q axis voltage command reference value vq_ref, which are operated simply from the theoretical formula of the electric motor, in the low rotation range in which the AC motor 2 is started or stopped, there is a possibility that voltage to be impressed on the AC motor 2 is not appropriate, which hence may make it impossible to stably drive the AC motor 2.

Hence, in the present embodiment, the d axis voltage command reference value vd_ref and the q axis voltage command reference value vq_ref are corrected to thereby operate the second d axis voltage command value vd*_2 and the second q axis voltage command value vq*_2. Then, in the low rotation range, the drive of the AC motor 2 is controlled on the basis of the second d axis voltage command value vd*_2 and the second q axis voltage command value vq*_2. In this way, in the low rotation range, the drive of the AC motor 2 can be stably controlled from the time when the AC motor 2 is started and driven until the time when the AC motor 2 is stopped.

The control section 15 further includes the dead time correction value operation part 32. Further, there is set the dead time period Tdt in which both of the upper SW and the lower SW are switched off when a state where one of the upper SW and the lower SW is on and where the other of them is off to another state where one of the upper SW and the lower SW is off and where the other of them is on, the upper SW being on the high electric potential side of the inverter 12, the lower SW being on the low electric potential side of the inverter 12. The dead time correction value operation part 32 operates the d axis dead time correction value vd_dt and the q axis dead time correction value vq_dt corresponding to the voltage error caused by the dead time period Tdt (S162 in FIG. 12). Then, the voltage command reference value correction part 23 corrects the d axis voltage command reference value vd_ref on the basis of the d axis dead time correction value vd_dt and corrects the q axis voltage command reference value vq_ref on the basis of the q axis dead time correction value vq_dt (S165).

In the low rotation range and low torque range, the effect of the voltage error caused by the dead time period Tdt is large. Hence, in the present embodiment, in particular, in order to ensure voltage necessary for starting the AC motor 2 from the state where the number of revolutions N is 0 [rpm], the voltage command reference value correction part 23 corrects the d axis voltage command reference value vd_ref and the q axis voltage command reference value vq_ref by the d axis dead time correction value vd_dt and the q axis dead time correction value vq_dt which correspond to the voltage error according to the dead time period Tdt. In more detail, the voltage command reference value correction part 23 adds the d axis dead time correction value vd_dt to the d axis voltage command reference value vd_ref to thereby correct the d axis voltage command reference value vd_ref, thereby operating the second d axis voltage command value vd*_2, whereas the voltage command reference value correction part 23 adds the q axis dead time correction value vq_dt to the q axis voltage command reference value vq_ref to thereby correct the q axis voltage command reference value vq_ref, thereby operating the second q axis voltage command value vq*_2. In this way, the second d axis voltage command value vd*_2 and the second q axis voltage command value vq*_2, which are used for the drive control of the AC motor 2 in the low rotation range, can be appropriately operated and hence the drive of the AC motor can be stably controlled in the low rotation range.

Moreover, the control section 15 further includes the amplitude correction coefficient operation part 40. The amplitude correction coefficient operation part 40 operates the amplitude correction coefficient Ka on the basis of the W phase current command value iw*, which is the voltage command value corresponding to the sensor phase (the W phase in the present embodiment), and the W phase current sensed value iw_sns (S153). In the present embodiment, the ratio of the W phase current command value iw* to the W phase current sensed value iw_sns is made the amplitude correction coefficient Ka. Then, the voltage command reference value correction part 23 corrects the d axis voltage command reference value vd_ref and the q axis voltage command reference value vq_ref on the basis of the amplitude correction coefficient Ka (S155).

An actual dead time in which both of the upper SW and the lower SW are switched off is likely to be varied from the dead time period Tdt set in advance. Further, the machine constants used for the operation of the voltage equation are likely to include an error. Hence, in the present embodiment, the amplitude correction coefficient Ka based on the W phase current command value iw* and the W phase current sensed value iw_sns is operated and the d axis voltage command reference value vd_ref and the q axis voltage command reference value vq_ref are corrected on the basis of the amplitude correction coefficient Ka. In this way, the second d axis voltage command value vd*_2 and the second q axis voltage command value vq*_2, which are used for the drive control of the AC motor 2 in the low rotation range, can be appropriately operated, whereby the drive of the AC motor 2 can be more stably controlled in the low rotation range.

Further, when the W phase current sensed value iw_sns is zero or within a range including zero, the amplitude correction coefficient operation part 40 interpolates the amplitude correction coefficient Ka. In the present embodiment, when the W phase current sensed value iw_sns is within the range including zero, the amplitude correction coefficient operation part 40 fixes the amplitude correction coefficient Ka, for example, at 1. In this way, it is possible to avoid the so-called "zero division" of dividing something by zero and hence to prevent the operation accuracy of the second d axis voltage command value vd*_2 and the second q axis voltage command value vq*_2 from being impaired.

In this regard, it is assumed that "zero" includes not only exact 0 [A] but also a value within a range substantially equivalent to 0 [A] in consideration of a sensing error and the resolution capability of the device.

Further, the amplitude correction coefficient operation part 40 set an upper limit and a lower limit for the amplitude correction coefficient Ka. In this way, it is possible to prevent the operation accuracy of the second d axis voltage command value vd*_2 and the second q axis voltage command value vq*_2 from being impaired.

In the present embodiment, the control section 15 constructs "a current acquisition device", "a rotation angle acquisition device", "a current estimation device", "a first voltage command value operation device", "a voltage command reference value operation device", "a second voltage command value operation device", "a control mode switching device", "a number-of-revolutions operation device", and "a dead time correction value operation device", and "a correction coefficient operation device". In more detail, the current estimation part 24 constructs "the current estimation device", and the voltage command value operation part 25 constructs "the first voltage command value operation device". The voltage command reference value operation part 22 constructs "the voltage command reference value operation device", and the voltage command reference value correction part 23 constructs "the second voltage command value operation device". The number-of-revolutions operation part 16 constructs "the number-of-revolutions operation device", and the switching determination part 26 constructs "the control mode switching device". Further, the dead time correction value operation part 32 constructs "the dead time correction value operation device", and the amplitude correction coefficient operation part 40 constructs "the correction coefficient operation device".

Further, S101 in FIG. 11 corresponds to processing as the functions of "the current acquisition device", "the rotation angle acquisition device", and "the number-of-revolutions operation device", and S102 corresponds to processing as the function of "the current estimation device", S104 corresponds to processing as the function of "the first voltage command value operation device". S164 in FIG. 12 corresponds to processing as the function of "the voltage command reference value operation device", and S165 in FIG. 12 corresponds to processing as the function of "the second voltage command value operation device". S105 and S107 in FIG. 11 correspond to processing as the function of "the control mode switching device". Further, S162 in FIG. 12 corresponds to processing as the function of "the dead time correction value operation device", and S163 in FIG. 12 corresponds to "the correction coefficient operation device".

Further, the W phase corresponds to "the sensor phase", and the W phase current sensed value iw_sns corresponds to "the sensor phase current sensed value", and the W phase current command value iw* corresponds to "the sensor phase current command value", and the electric angle θe corresponds to "the rotation angle sensed value". Each of the d axis current estimated value id_est and the q axis current estimated value iq_est corresponds to "the current estimated value", and each of the d axis current command value id* and the q axis current command value iq* corresponds to "the current command value". Each of the first d axis voltage command value vd*_1 and the first q axis voltage command value vq*_1 corresponds to "the first voltage command value". Each of the d axis voltage command reference value vd_ref and the q axis voltage command reference value vd_ref corresponds to "the voltage command reference value", and each of the second d axis voltage command value vd*_2 and the second q axis voltage command value vq*_2 corresponds to "the second voltage command value".

Further, each of the d axis dead time correction value vd_dt and the q axis dead time correction value vq_dt corresponds to "the dead time correction value", and the amplitude correction coefficient Ka corresponds to "the correction coefficient".

Still further, each of the PWM signals UU, UL, VU, VL, WU, WL corresponds to "the drive signal".

Second Embodiment

Figure 15:
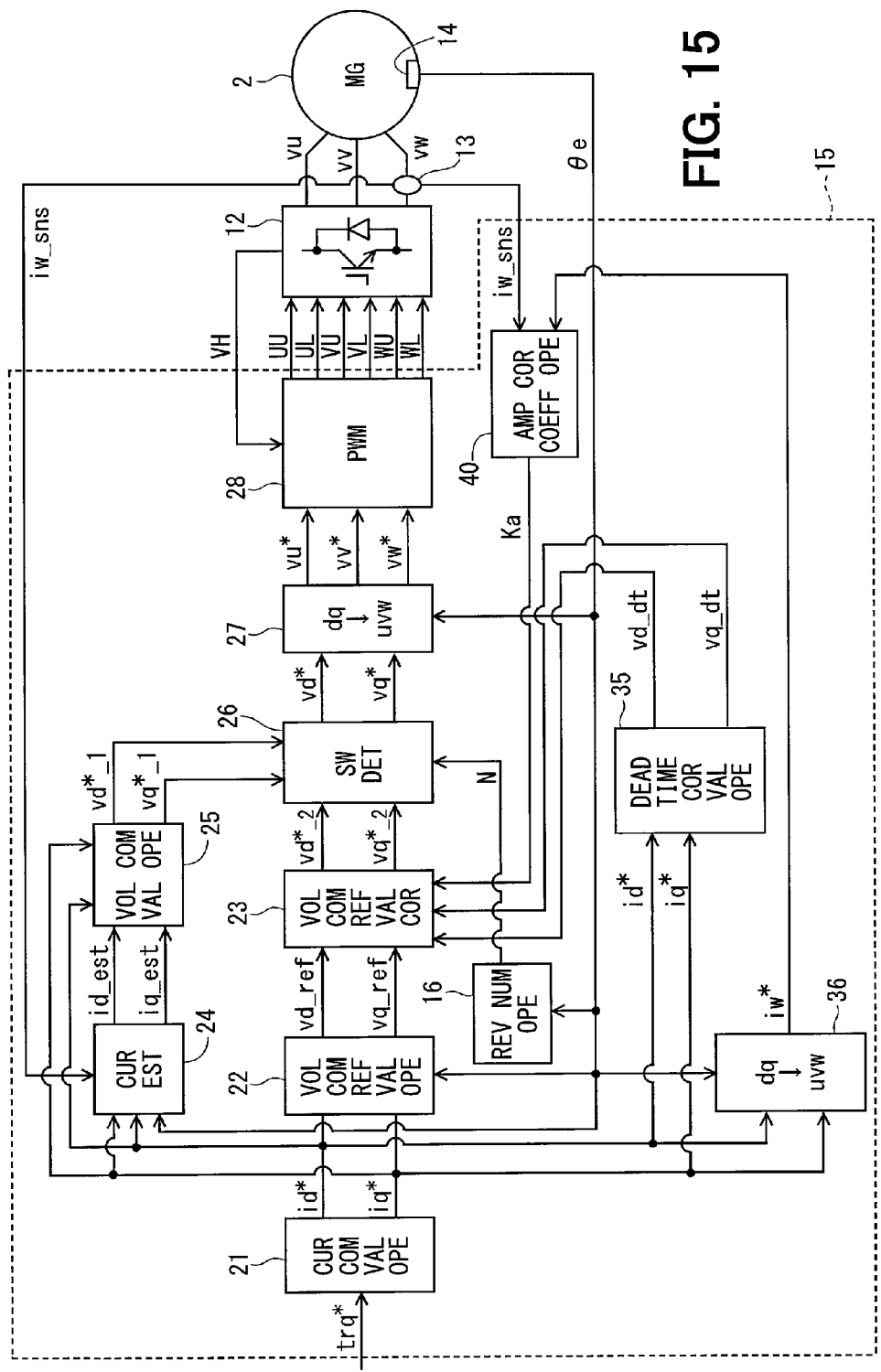
FIG. 15 is a block diagram to show a construction of a control section of a second embodiment of the present disclosure.
Figure 16A:
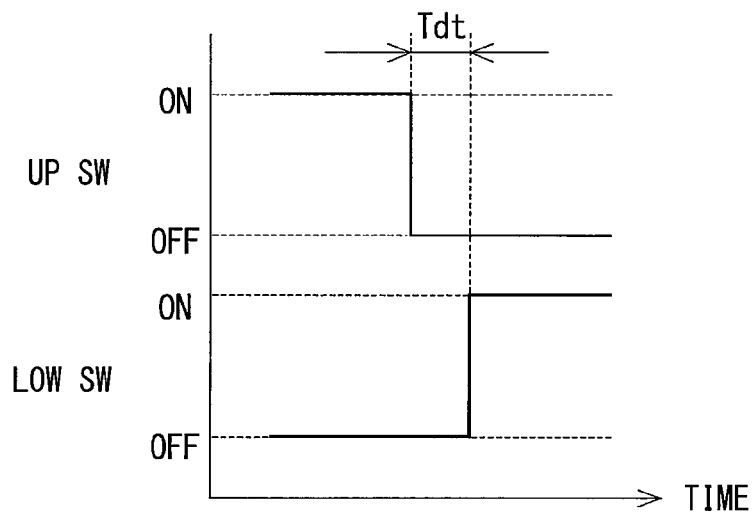
FIGS. 16A and 16B are time charts to illustrate a dead time correction according to the second embodiment of the present disclosure.
Figure 16B:
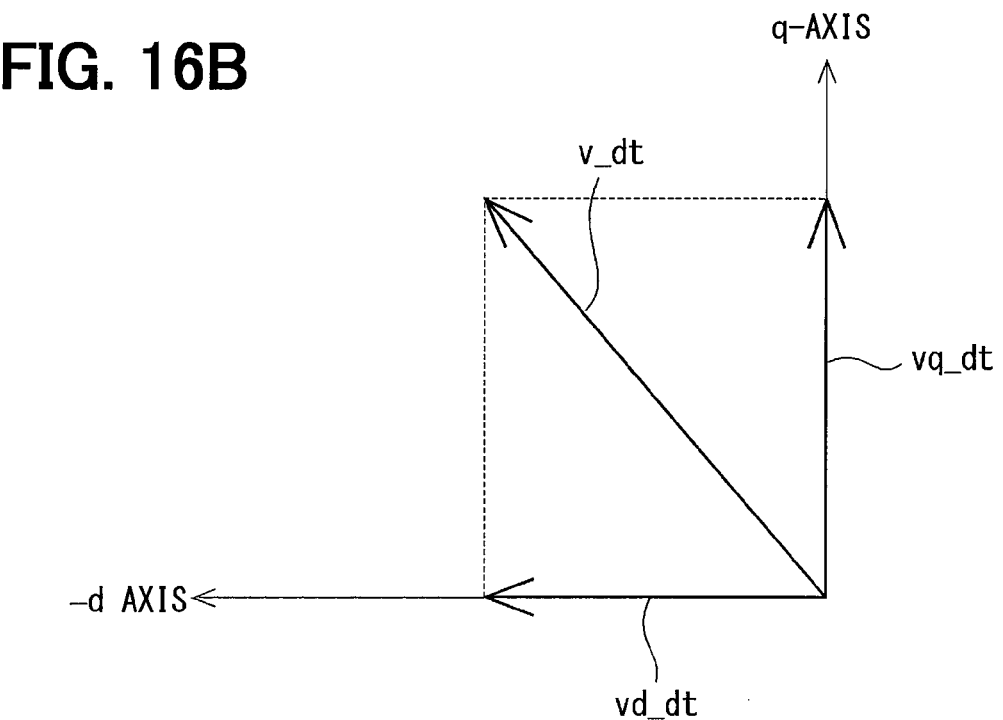

A second embodiment of the present disclosure is different from the embodiment described above in a method for operating a dead time correction value, so this different point will be mainly described on the basis of FIG. 15 and FIGS. 16A and 16B.

As shown in FIG. 15, a control section 15 of the present embodiment is different from the embodiment described above in a dead time correction value operation part 35 and a three phase current command value operation part 36.

The dead time correction value operation part 35 has the d axis current command value id* and the q axis current command value iq* directly inputted thereto without being inversely dq transformed.

Further, the three phase current command value operation part 36 inversely dq transforms the d axis current command value id* and the q axis current command value iq* to the W phase current command value iw* on the basis of the electric angle θe. In the present embodiment, the U phase current command value iu* and the V phase current command value iv* are not operated. The operated W phase current command value iw* is outputted to the amplitude correction coefficient operation part 40 and is used for the operation of the amplitude correction coefficient Ka.

Here, a method of operating a dead time correction value in the dead time correction value operation part 35 will be described on the basis of FIGS. 16A and 16B.

In the present embodiment, a dead time correction value v_dt on the d–q coordinates is operated on the basis of the dead time period Tdt. The dead time correction value v_dt is expressed by the following equation (11). K in the equation is a coefficient of transformation to the d-q coordinates.

$$v\_dt = K \times Tdt \times fc \times VH \tag{11}$$

Then, the dead time correction value v_dt is divided between the d axis and the q axis according to the magnitude of the d axis current command value id* and the q axis current command value iq*, whereby a d axis dead time correction value vd_dt and a q axis dead time correction value vq_dt are operated. The d axis dead time correction value vd_dt and the q axis dead time correction value vq_dt in the present embodiment are shown in equations (12) and (13). Ia in the equations is a current command amplitude.

$$vd\_dt = v\_dt \times (id^*/Ia) \tag{12}$$

$$vq\_dt = v\_dt \times (iq^*/Ia) \tag{13}$$

Also in this way, the second d axis voltage command value vd*_2 and the second q axis voltage command value vq*_2, which are used for controlling the drive of the AC motor in the low rotation range, can be appropriately operated, so that the drive of the AC motor 2 can be more stably controlled in the low rotation range.

Further, the present embodiment can produce the same effect as the embodiment described above.

In the present embodiment, the dead time correction value operation part 35 constructs "a dead time correction value operation device".

Other Embodiments (A) In the embodiments described above, in the FF control in the low rotation range, it is considered that the voltage command correction value, which corresponds to the difference between the theoretical voltage command value which is calculated from the voltage formula and the voltage command value relating to the actual drive of the AC motor which generates torque according to the command, is the voltage error in the dead time period, and the voltage command reference value is corrected on the basis of the dead time correction value. In the other embodiment, the voltage command correction value is not limited to a value based on the dead time correction value but may be any value in such a way that the AC motor can be stably driven in the low rotation range, as long as the voltage command correction value is a value corresponding to the difference between the theoretical voltage command reference value and the voltage command value relating to the actual drive of the AC motor which can generate torque according to the command. In other words, the voltage command reference value may be corrected on the basis of any value. Further, the dead time correction value may be operated by a method other than the method described in the embodiments described above.

(B) In the first embodiment described above, the three phase current command values are used for determining whether the phase current of each phase is plus or minus in the operation of the dead time correction value. In the other embodiment, whether the current of the sensor phase is plus or minus may be determined on the basis of the current sensed value. In other words, it can be said that whether the dead time correction value is plus or minus is determined on the basis of whether the current command value or the current sensed value is plus or minus.

Further, in the other embodiment, the dead time correction value may be made zero when the current command value of each phase is zero or within a given range including zero. Further, in order to prevent the dead time correction value from being suddenly changed when the current command value of each phase crosses zero, smoothing processing of low pass filter processing or the like may be performed as required. Here, "the given range" described above may be the same as or different from "the given range" relating to the interpolation of the amplitude correction coefficient in the operation of the correction coefficient.

(C) In the embodiments described above, the voltage command reference value is corrected on the basis of the current command value to the current sensed value. In the other embodiment, not only correction based on the ratio but also any correction may be made when the correction is based on the current command value and the current sensed value. Further, it is not necessary to make the correction based on the current command value and the current sensed value.

Further, when the current sensed value is within the given range including zero, the correction factor may be fixed at a value other than 1 or may be interpolated by continuously operating, for example, filter processing or the like. Still further, it is not necessary to set the upper limit and the lower limit for the correction coefficient.

(D) A determination threshold value of the number of revolutions which relates to switching between the FF control processing and the estimated current FB control processing can be set appropriately in consideration of the operation accuracy or the like of the estimated current FB control processing. Further, in the embodiments described above, the switching between the FF term correction processing and the estimated current FB control processing is made by one determination threshold value. In the other embodiment, in order to avoid hunting in the switching between the FF term correction processing and the estimated current FB control processing, the determination threshold value of the number of revolutions may be set at different values on the side in which the number of revolutions increases and on the side in which the number of revolutions decreases. That is, the determination threshold value of the number of revolutions may have hysteresis set on the side in which the number of revolutions increases and on the side in which the number of revolutions decreases. In this case, when it is assumed that a determination threshold value on the increasing side is Au and that a determination threshold value on the decreasing side is Ad, it is desirable that, for example, Au>Ad but it is acceptable that Au<Ad.

(E) In the embodiments described above, in the current estimation part, the d axis current estimated value and the q axis estimated value are operated by considering that the current command value is the estimated value for the phase other than the sensor phase.

An operation method in the current estimation part is not limited to this method but any method may be employed, if the method is performed on the basis of the current sensed value and the electric angle, and the method may use other parameter or the like. Further, the first voltage command value may be calculated by any method, if the method calculates the first voltage command value on the basis of the current command value and the current estimated value fed back, and the method may use other parameter or the like.

Still further, in the embodiments described above, the d axis current estimated value, the q axis current estimated value, the first d axis voltage command value, and the first q axis voltage command value are always operated irrespective of the number of revolutions. In the other embodiment, when the number of revolutions is more than a determination threshold value, the d axis current estimated value, the q axis current estimated value, the first d axis voltage command value, and the first q axis voltage command value are operated, whereas when the number of revolutions is not more than the determination threshold value, the operation of the d axis current estimated value, the q axis current estimated value, the first d axis voltage command value, and the first q axis voltage command value may be stopped.

Hereinafter, a current estimation method that the current estimation part can employ will be described by way of example.

(i) Operation Based on a Reference Angle, which Uses a Current Command Phase, and an Amplitude For example, like JP-A 2004-159391, a current amplitude (Ia) is calculated by dividing a U phase current sensed value (Iu) by "a U phase current reference angle ($\theta'$), which is generated from a current command phase angle and an electric angle", and current estimated values Iv, Iw of the other two phases are calculated by multiplying a sine value at an electric angle, which is shifted from the U phase current reference angle ($\theta'$) by $\pm 120[°]$, by the current amplitude (Ia) (equations 14.1 to 14.3)

$$Ia = Iu/[\sqrt{(1/3)} \times (\{-\sin(\theta')\})] \quad (14.1)$$

$$Iv = \sqrt{(1/3)} \times Ia \times (\{-\sin(\theta'+120[°])\}) \quad (14.2)$$

$$Iw = \sqrt{(1/3)} \times Ia \times (\{-\sin(\theta'+240[°])\}) \quad (14.3)$$

Hereinafter, in (ii) to (iv), the description will be made on the assumption that the sensor phase is the W phase.

(ii) Operation Based on the Sensor Phase Reference Phase Using the Current Command Value An $\alpha$ axis current i$\alpha$ in an $\alpha$ axis direction, which corresponds to the sensor phase, and a $\beta$ axis current i$\beta$ in a $\beta$ axis direction, which intersects the sensor phase, are operated by the use of at least one of the U phase current command value iu* and the V phase current command value iv*, the W phase current sensed value iw_sns, and the electric angle $\theta$e, and the sensor phase reference current phase $\theta$x is calculated by an arctangent function (arctan) of the $\alpha$ axis current i$\alpha$ and the $\beta$ axis current i$\beta$. An operation equation of the sensor phase reference current phase Ox will be shown in an equation (15).

$$\theta x = \tan^{-1}(i\beta/i\alpha) \quad (15)$$

Further, the U phase current estimated value iu_est or the V phase current estimated value iv_est are operated on the basis of the sensor phase reference current phase Ox and the W phase current sensed value iw_sns, and the d axis current estimated value id_est and the q axis current estimated value iq_est are operated on the basis of the U phase current estimated value iu_est or the V phase current estimated value iv_est, the W phase current sensed value iw_sns, and the electric angle $\theta$e. In this regard, in the operation of the U phase current estimated value iu_est or the V phase current estimated value iv_est, there may be performed correction processing of avoiding "the zero division" of dividing something by zero and "the zero multiplication" of multiplying something by zero.

(iii) Operation by Differentiating $\alpha$ Axis Current

By focusing on that the $\alpha$ axis current i$\alpha$ and the $\beta$ axis current i$\beta$ are in the relationship between "a sine wave and a cosine wave" and that a phase difference between the $\alpha$ axis current i$\alpha$ and the $\beta$ axis current i$\beta$ is 90 [°], a $\beta$ axis current estimated value i$\beta$_est is operated on the basis of an $\alpha$ axis current differentiated value $\Delta$i$\alpha$. Here, when the operation in the control section is a discrete system, the $\alpha$ axis current differentiated value $\Delta$i$\alpha$ is delayed by a half of an electric angle movement $\Delta\theta$e with respect to an actual $\beta$ axis current i$\beta$. Taking this in consideration, it is preferable that the $\beta$ axis current estimated value i$\beta$_est is operated by correcting the actual β axis current iβ by a correction amount H obtained by multiplying an average value of the α axis current iα of the last time and the α axis current iα of this time by a half (Δθe/2) of the electric angle movement Δθe. Then, the sensor phase reference current phase Ox is operated by the use of the α axis current iα and the β axis current estimated value iβ_est. The subsequent operations are the same as those in (ii).

(iv) Operation by a Recurrence Formula

By using that the W phase axis relatively rotates on the d-q coordinates of the rotating coordinate system, a W phase estimated error Δiw_est is integrated to thereby make the d axis current estimated value id_est and the q axis current estimated value iq_est asymptotic to the d axis actual current value id and the q axis actual current value iq, respectively.

A W phase current reference value iw_bf of a sensor phase component is operated on the basis of the d axis current estimated value id_est of the last time and the q axis current estimated value iq_est of the last time and the electric angle θe of this time, and the W phase estimated error Δiw_est, which is a difference between the W phase current reference value iw_bf and the W phase current sensed value iw_sns, is calculated. A corrected error KΔiw_est is calculated by multiplying the W phase estimated error Δiw_est by a gain K of a filter element, and a d axis corrected value id_crr and a q axis corrected value iq_crr in the sensor phase direction are calculated by the dq transformation on the assumption that Δiu=0 and Δiv=0. Then, the calculated d axis corrected value id_crr and the calculated q axis corrected value iq_crr are made a correction vector in the sensor phase direction and the correction vector is integrated on the d-q coordinates, whereby the d axis current estimated values id_est and the q axis current estimated values iq_est are operated. Moreover, the following operation may be employed: corrected values in an orthogonal direction orthogonal to the sensor phase are further operated; a resultant vector of the corrected values in the sensor phase direction and the corrected values in the orthogonal direction is made a correction vector; and the correction vector is integrated on the d-q coordinates.

(F) In the embodiments described above, "the current estimated value", "the current command value", "the first voltage command value", "the second voltage command value", and "the dead time correction value" have been described for the d-q coordinates. However, any values may be used, and the values may be based on the values of the respective phases or the values based on the other axis, as long as the values can be used for the control of the AC motor.

(G) The inverter for controlling the voltage to be impressed on the AC motor may be controlled by any method. For example, the inverter may be so constructed as to be controlled by appropriately switching between the sine wave PWM control mode and the overmodulation PWM control mode.

(H) In the embodiments described above have been described the examples in which the current sensor is provided in the W phase and in which the W phase is the sensor phase. In the other embodiment, the current sensor may be provided in the U phase and the U phase may be made the sensor phase. Further, the current sensor may be provided in the V phase and the V phase may be made the sensor phase.

(I) In the embodiments described above have been described the examples in which the current sensor is provided in one phase. In the other embodiment, for example, an independent current sensor (hereinafter, referred to as an abnormality sensing sensor) for sensing an abnormality in a current sensor (hereinafter, referred to as a control sensor) for sensing current used for control may be provided in a sensor phase or in a phase other than the sensor phase. As examples can be provided sensor constructions such as a one-phase two-channel construction in which a control sensor and an abnormality sensing sensor are provided in one phase and a two-phase one-channel construction in which a control sensor is provided in one phase and in which an abnormality sensing sensor is provided in any one phase other than the one phase, but any number of current sensors may be provided in any phase.

(J) In the embodiments described above, the rotation angle sensor senses the electric angle θe and outputs the electric angle θe to the control section. In the other embodiment, the rotation angle sensor may sense a mechanical angle θm and may output the mechanical angle θm to the control section and the mechanical angle θm may be converted to the electric angle θe in the control section. Further, the mechanical angle θm may be made "the rotation angle sensed value" in place of the electric angle θe. Still further, the number of revolutions N may be calculated on the basis of the mechanical angle θm.

(K) In the embodiments described above, the AC motor is the three phase AC motor of the permanent magnet synchronous type. In the other embodiment, the AC motor may be an induction motor or the other synchronous motor. Further, each of the AC motors of the embodiments described above is the so-called motor generator having both of the function as the electric motor and the function as the generator. In the other embodiment, the AC motor may be an electric motor not having the function as the generator.

The AC motor may be so constructed as to operate as an electric motor for an engine and to start the engine. Further, the engine may not be provided. Still further, a plurality of AC motors may be provided and a power dividing mechanism for dividing the power of the plurality of AC motors may further be provided.

(L) Further, the control device of the AC motor according to the present disclosure may be applied not only to the system having one set of the inverter and the AC motor, as described in the above embodiments, but also to a system having two or more sets of the inverter and the AC motor. Further, the control device of the AC motor according to the present disclosure may be applied to a system of an electric train or the like having a plurality of AC motors connected in parallel to one inverter.

Still further, the control device of the AC motor is applied to the electric vehicle but may be applied to a machine other than the electric vehicle.

The above disclosure has the following aspects.

According to an aspect of the present disclosure, a control device of a three phase alternating current motor having an applied voltage, which is controlled by an inverter, the control device controls a drive of the motor, and includes: a current acquisition device for acquiring a current sensed value from a current sensor, which is disposed on a sensor phase of the motor that is one of three phases of the motor; a rotation angle acquisition device for acquiring a rotation angle sensed value from a rotation angle sensor, which senses a rotation angle of the motor; a current estimation device for operating a current estimated value according to the current sensed value and the rotation angle sensed value; a first voltage command value operation device for operating a first voltage command value according to a current command value, which relates to the drive of the motor, and the current estimated value to be fed back; a voltage command reference value operation device for operating a voltage command reference value using a theoretical formula of an electric motor according to the current command value; a second voltage command value operation device for correcting the voltage command reference value in order to operate a second voltage command value; a control mode switching device for switching between a first control mode, for generating a drive signal relating to a drive of the inverter based on the first voltage command value, and a second control mode, for generating the drive signal based on the second voltage command value; and a number-of-revolutions operation device for operating the number of revolutions of the motor according to the rotation angle sensed value. When the number of revolutions is more than a predetermined determination threshold value, the control mode switching device selects the first control mode. When the number of revolutions is not more than the predetermined determination threshold value, the control mode switching device selects the second control mode.

When one phase control is performed in which a current estimated value estimated by the use of a current sensed value of one phase is fed back to thereby control the drive of the AC motor, in a low rotation range in which the number of revolutions of the AC motor is small, a current change in the current sensed value and a rotation angle movement per a sampling interval become small, whereby the drive control of the AC motor is likely to be made unstable.

For this reason, in the present disclosure, in a low rotation range in which the number of revolutions of the AC motor is not more than a determination threshold value, the voltage command reference value is operated by the use of a theoretical formula of an electric motor (for example, voltage equation) in place of the one phase control on the basis of the current command value. However, there is a case where a theoretical voltage command reference value calculated from the theoretical formula of the electric motor is different from a voltage command value relating to an actual drive of the AC motor, which generates torque according to the command by a physical factor and the like relating to the AC motor and the control device of the AC motor. In particular, when the drive of the AC motor is controlled on the basis of the voltage command reference value operated simply from the theoretical formula of the electric motor in the low rotation range in which the AC motor is started and stopped, there is a possibility that voltage impressed on the AC motor is not appropriate, so that the AC motor could not be stably driven.

Hence, in the present disclosure, the voltage command reference value is corrected and the second voltage command value is operated, and in the low rotation range, the drive of the AC motor is controlled in the second control mode based on the second voltage command value. In this way, according to the present disclosure, in the low rotation range, the drive of the AC motor can be stably controlled from the time when the AC motor is started and driven to the time when the AC motor is stopped.

Alternatively, the control device may further include: a dead time correction value operation device for operating a dead time correction value according to a voltage error caused by a dead time period, in which both of an upper switching element and a lower switching element are switched off, when a state, where one of the upper switching element and the lower switching element turns on and the other turns off, is switched to a state, where the one of the upper switching element and the lower switching element turns off and the other turns on. The upper switching element for providing the inverter is disposed on a high electric potential side, and the lower switching element for providing the inverter is disposed on a low electric potential side. The second voltage command value operation device corrects the voltage command reference value based on the dead time correction value. Further, the control device may further include: a correction coefficient operation device for operating a correction coefficient according to a sensor phase current command value, which is the current command value corresponding to the sensor phase, and the current sensed value. The second voltage command value operation device corrects the voltage command reference value based on the dead time correction value and the correction coefficient. Furthermore, when the sensor phase current command value or the current sensed value is zero or within a predetermined range including zero, the correction coefficient operation device may interpolate the correction coefficient. Furthermore, the correction coefficient operation device may set an upper limit and a lower limit for the correction coefficient.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device of a three phase alternating current motor having an applied voltage, which is controlled by an inverter, the control device controlling a drive of the motor, the control device comprising:
a current acquisition device for acquiring a current sensed value from a current sensor, which is disposed on a sensor phase of the motor that is one of three phases of the motor;
a rotation angle acquisition device for acquiring a rotation angle sensed value from a rotation angle sensor, which senses a rotation angle of the motor;
a current estimation device for operating a current estimated value according to the current sensed value and the rotation angle sensed value;
a first voltage command value operation device for operating a first voltage command value according to a current command value, which relates to the drive of the motor, and the current estimated value to be fed back;
a voltage command reference value operation device for operating a voltage command reference value using a theoretical formula of an electric motor according to the current command value;
a second voltage command value operation device for correcting the voltage command reference value in order to operate a second voltage command value;
a control mode switching device for switching between a first control mode, for generating a drive signal relating to a drive of the inverter based on the first voltage command value, and a second control mode, for generating the drive signal based on the second voltage command value; and
a number-of-revolutions operation device for operating the number of revolutions of the motor according to the rotation angle sensed value,
wherein, when the number of revolutions is more than a predetermined determination threshold value, the control mode switching device selects the first control mode, and wherein, when the number of revolutions is not more than the predetermined determination threshold value, the control mode switching device selects the second control mode.

2. The control device according to claim 1, further comprising:
a dead time correction value operation device for operating a dead time correction value according to a voltage error caused by a dead time period, in which both of an upper switching element and a lower switching element are switched off, when a state, where one of the upper switching element and the lower switching element turns on and the other turns off, is switched to a state, where the one of the upper switching element and the lower switching element turns off and the other turns on,
wherein the upper switching element for providing the inverter is disposed on a high electric potential side, and the lower switching element for providing the inverter is disposed on a low electric potential side, and
wherein the second voltage command value operation device corrects the voltage command reference value based on the dead time correction value.

3. The control device according to claim 2, further comprising:
a correction coefficient operation device for operating a correction coefficient according to a sensor phase current command value, which is the current command value corresponding to the sensor phase, and the current sensed value,
wherein the second voltage command value operation device corrects the voltage command reference value based on the dead time correction value and the correction coefficient.

4. The control device according to claim 3,
wherein, when the sensor phase current command value or the current sensed value is zero or within a predetermined range including zero, the correction coefficient operation device interpolates the correction coefficient.

5. The control device according to claim 3,
wherein the correction coefficient operation device sets an upper limit and a lower limit for the correction coefficient.

* * * * *